United States Patent
Yang et al.

(10) Patent No.: US 10,996,399 B2
(45) Date of Patent: May 4, 2021

(54) SPACE-DIVISION MULTIPLEXED RECONFIGURABLE, WAVELENGTH SELECTIVE SWITCH

(71) Applicant: Roadmap Systems Ltd, Cambridge (GB)

(72) Inventors: Haining Yang, Cambridge (GB); Daping Chu, Cambridge (GB)

(73) Assignee: Roadmap Systems Ltd, Cambridge (GB)

( * ) Notice: Subject to any disclaimer, the term of this patent is extended or adjusted under 35 U.S.C. 154(b) by 146 days.

(21) Appl. No.: 16/467,160

(22) PCT Filed: Dec. 5, 2017

(86) PCT No.: PCT/GB2017/053668
§ 371 (c)(1),
(2) Date: Jun. 6, 2019

(87) PCT Pub. No.: WO2018/104725
PCT Pub. Date: Jun. 14, 2018

(65) Prior Publication Data
US 2020/0073054 A1    Mar. 5, 2020

(30) Foreign Application Priority Data
Dec. 6, 2016    (GB) ..................... 1620744

(51) Int. Cl.
*G02B 6/293*    (2006.01)
*G02B 6/35*    (2006.01)
(Continued)

(52) U.S. Cl.
CPC ...... *G02B 6/29385* (2013.01); *G02B 6/29311* (2013.01); *G02B 6/356* (2013.01);
(Continued)

(58) Field of Classification Search
None
See application file for complete search history.

(56) References Cited

U.S. PATENT DOCUMENTS

| 4,767,194 A | 8/1988 | Heppke |
| 5,121,231 A | 6/1992 | Jenkins |

(Continued)

FOREIGN PATENT DOCUMENTS

| CN | 1886691 A | 12/2006 |
| CN | 101665014 A | 3/2010 |

(Continued)

OTHER PUBLICATIONS

Carpenter et al., "1×11 Few-Mode Fiber Wavelength Selective Switch using Photonic Lanterns," OFC 2014 Copyright OSA 2014, 3 pages.

(Continued)

*Primary Examiner* — Chad H Smith
(74) *Attorney, Agent, or Firm* — Loginov & Associates. PLLC; William A Loginov

(57) ABSTRACT

We describe a space-division multiplexed (SDM) fibre, reconfigurable, wavelength-selective switch (WSS). The switch comprises a space-division multiplexed (SDM) optical input port to receive a space-division multiplexed (SDM) optical input signal comprising a plurality of space division modes each of said space division modes carrying a respective data signal, wherein each of said space division modes is also wavelength division multiplexed (WDM); an optical space division demultiplexer, coupled to said input port, to split said space-division multiplexed (SDM) optical input signal into a plurality of space division demultiplexed optical signals on separate demultiplexer outputs of said demultiplexer, each said demultiplexer output of said demulti- (Continued)

plexer comprising a wavelength division multiplexed one of said plurality of space division modes; a set of reconfigurable wavelength-selective optical switches, each reconfigurable wavelength-selective optical switch having a switch input and a set of N switch outputs, and each including a dispersive element and a controllable beam steering element such that each said reconfigurable wavelength-selective optical switch is reconfigurable to selectively direct different respective wavelengths of a WDM optical signal at said switch input to different selected outputs of said set of N switch outputs, and wherein each said demultiplexer output is coupled to said switch input of a respective one of said set of reconfigurable wavelength-selective optical switches; and a set of optical space division multiplexers, one for each of said N switch outputs, each said optical space division multiplexer having a set of multiplexer inputs and a multiplexer output, to re-multiplex optical signals at said multiplexer inputs into a space-division multiplexed optical output signal at said multiplexer output, and wherein, for each of said set of optical space division multiplexers, each multiplexer input of said set of multiplexer inputs is coupled to said switch output of a different respective one of said set of reconfigurable wavelength-selective optical switches.

15 Claims, 15 Drawing Sheets

(51) Int. Cl.
H04B 10/2581 (2013.01)
H04J 14/04 (2006.01)
H04Q 11/00 (2006.01)

(52) U.S. Cl.
CPC ......... G02B 6/3512 (2013.01); G02B 6/3558 (2013.01); H04B 10/2581 (2013.01); H04J 14/04 (2013.01); H04Q 11/0005 (2013.01); H04Q 2011/0016 (2013.01); H04Q 2011/0028 (2013.01); H04Q 2011/0049 (2013.01)

(56) References Cited

U.S. PATENT DOCUMENTS

| | | |
|---|---|---|
| 5,319,492 A | 6/1994 | Dorn |
| 5,416,616 A | 5/1995 | Jenkins |
| 5,617,227 A | 4/1997 | De |
| 7,145,710 B2 | 12/2006 | Holmes |
| 7,174,065 B2 | 2/2007 | Lacey |
| 7,397,980 B2 | 7/2008 | Frisken |
| 7,457,547 B2 | 11/2008 | Frisken |
| 7,542,197 B2 | 6/2009 | Ishii |
| 7,664,395 B2 | 2/2010 | Holmes |
| 8,867,917 B2 | 10/2014 | Frisken |
| 9,363,582 B2 | 6/2016 | Chu |
| 9,774,930 B2 | 9/2017 | Chu |
| 2001/0050787 A1 | 12/2001 | Crossland |
| 2002/0131690 A1 | 9/2002 | Belser |
| 2004/0080733 A1 | 4/2004 | Shiraishi |
| 2006/0067611 A1 | 3/2006 | Frisken |
| 2007/0080370 A1 | 4/2007 | Miyachi |
| 2009/0028503 A1 | 1/2009 | Garrett |
| 2011/0280573 A1 | 11/2011 | Collings |
| 2012/0026591 A1 | 2/2012 | Hayashibe |
| 2012/0057235 A1 | 3/2012 | Chang |
| 2012/0163825 A1 | 6/2012 | Wu |
| 2012/0219252 A1 | 8/2012 | Marom |
| 2014/0355985 A1* | 12/2014 | Chu ............... G03H 1/2294 398/49 |
| 2014/0363162 A1 | 12/2014 | Chu |
| 2015/0085884 A1 | 3/2015 | Fontaine |
| 2015/0208144 A1 | 7/2015 | Holmes |
| 2017/0230132 A1 | 8/2017 | Chu |
| 2018/0278359 A1 | 9/2018 | Robertson |

FOREIGN PATENT DOCUMENTS

| | | |
|---|---|---|
| CN | 101685168 A | 3/2010 |
| CN | 104204916 B | 12/2014 |
| EP | 1688783 A1 | 8/2006 |
| EP | 2807519 B1 | 12/2014 |
| GB | 2350961 A | 12/2000 |
| GB | 2430048 A | 3/2007 |
| GB | 2456170 A | 7/2009 |
| JP | 2002010368 A | 1/2002 |
| JP | 2002040368 A | 2/2002 |
| JP | 2002357802 A | 12/2002 |
| JP | 2006243760 A | 9/2006 |
| JP | 2007510957 A | 4/2007 |
| JP | 2009198592 A | 9/2009 |
| JP | 2010244068 A | 10/2010 |
| JP | 2015509215 A | 3/2015 |
| KR | 1020060104994 A | 10/2006 |
| KR | 20140122254 A | 10/2014 |
| WO | 03021341 A2 | 3/2003 |
| WO | 2005047942 A1 | 5/2005 |
| WO | 2005052674 A1 | 6/2005 |
| WO | 2006047834 A1 | 5/2006 |
| WO | 2006110241 A1 | 10/2006 |
| WO | 2007131649 A1 | 11/2007 |
| WO | 2011117538 A2 | 9/2011 |
| WO | 2012123715 A1 | 9/2012 |
| WO | 2013117903 | 8/2013 |
| WO | 2014141281 A1 | 9/2014 |
| WO | 2017051157 A1 | 3/2017 |

OTHER PUBLICATIONS

Crossland et al., "Holographic Optical Switching: The "ROSES" Demonstrator," Journal of Lightwave Technology, vol. 18, No. 12, Dec. 2000, 10 pages.

Den Boer, "Chap. 4: AMLCD Electronics, Chap. 5: Active Matrix Liquid Crystal Displays: Fundamentals and Applications", Jan. 1, 2005, pp. 87-113, Publisher: Elsevier, Published in: US.

Diego Gil Leyva Zambada, "Holographic wave front optimisation on an adaptive optical free-space interconnect," Jun. 2005, 160 pages.

Filippini et al., "Nematogenic liquids: a new class of materials for Kerr cells," J. Phys. D; Appl. Phys., vol. 8, No. 12, 1975, XP-002221225, 4 pages.

Fontaine et al., "Few-Mode Fiber Wavelength Selective Switch with Spatial-Diversity and Reduced-Steering Angle," OFC 2014 Copyright OSA 2014, 3 pages.

Fontaine et al., "Heterogeneous Space-Division Multiplexing and Joint Wavelength Switching Demonstration," OFC Postdeadline Papers Copyright OSA 2015, 3 pages.

Fontaine Nicolas K, "Wavelength selective switches supporting multiple spatial modes", 2015 International Conference on Photonics in Switching (PS), IEEE, (Sep. 22, 2015), doi:10.1109/PS.2015.7328971, pp. 115-117, XP032799077.

J.R. Salazar-Gil et al, "Wavelength-selective Switch for Few-mode Fiber Transmission", 39th European Conference and Exhibition on Optical Communication (ECOC 2013), (Jan. 1, 2013), doi:10.1049/cp.2013.1681, ISBN 978-1-84919-759-5, pp. 1224-1226, XP055453072.

Labroille et al., "Efficient and mode selective spatial mode multiplexer based on multi-plane light conversion," Copyright 2014 Optical Society of America, vol. 22, No. 13, DOI: 10.1364/OE.22.015599, 9 pages.

Lin et al., "Polarization-independent and high-diffraction-efficiency Fresnel lenses based on blue phase liquid crystals," Optics Letters, vol. 36, No. 4, Feb. 15, 2011, XP-001560236, pp. 502-504.

Okuno et al., "Recent Progress in Optical Switches Based on Planar Lightware Circuit Technology", 2002, pp. 55-56, Publisher: IEEE Conference.

(56) References Cited

OTHER PUBLICATIONS

Suzuki Kenya et al, "Wavelength selective switch for multi-core fiber based space division multiplexed network with core-by-core switching capability", 2016 21st Optoelectronics and Communications Conference (OECC) Held Jointly With 2016 International Conference on Photonics in Switching (PS), IEICE, (Jul. 3, 2016), pp. 1-3, XP032986247.

Yunhong Ding et al, "Route-and-Select Type Wavelength Cross Connect for Core-Shuffling of 7-Core MCFs with Spatial and Planar Optical Circuit", Scientific Reports, London, doi:10.1038/srep39058, (Dec. 21, 2016), p. 39058, URL: http://ieeexplore.ieee.org/ielx7/7766125/7766126/07767710.pdf?tp=&arnumber=7767710&isnumber=7766126, (Feb. 23, 2018), XP055453772.

Bernardo, "ABCD Matrix Formalism of Fractional Fourier Optics", "Opt. Eng.", Mar. 1996, pp. 732-740, vol. 35, No. 3, Publisher: Society of Photo-Optical Instrumentation Engineers, Published in: US.

Gil-Leyva, et al., "Aberration Correction in an Adaptive Free-Space Optical Interconnect With an Error Diffusion Algorithm", "Applied Optics", Jun. 1, 2006, pp. 3782-3792, vol. 45, No. 16, Publisher Optical Society of America, Published in: US.

Zhang, et al. "Beam Shaping in the Fractional Fourier Transform Domain", "J. Opt. Soc. Am. A", 1998, pp. 1114-1120, vol. 15, No. 5, Publisher: Optical Society of America, Published in: US.

Testorf, "Design of Diffractive Optical Elements for the Fractional Fourier Transform Domain: Phase-Space Approach", "Applied Optics", Jan. 1, 2006, pp. 76-82, vol. 45, No. 1, Publisher: Optical Society of America, Published in: US.

Ozaktas, et al., "Digital Computation of the Fractional Fourier Transform", "Transactions on Signal Processing", Sep. 1996, pp. 2141-2150, vol. 44, No. 9, Publisher: IEEE, Published in: US.

Ozaktas, et al., "Fractional Fourier Optics", "J. Opt. Soc. Am. A", Apr. 1995, pp. 743-751, vol. 12, No. 4, Publisher: Optical Society of America, Published in: US.

Ozaktas, et al., "The Fractional Fourier Transform With Applications in Optics and Signal Processing", 2001, pp. 418-419, Publisher: John Wiley & Sons, Ltd, Published in: US.

Moreno, et al., "Fractional Fourier Transform Optical System With Programmable Lenses", "Applied Optics", Nov. 10, 2003, pp. 6544-6548, vol. 42, No. 32, Publisher: Optical Society of America, Published in: US.

Bernardo, et al., "Fractional Fourier Transforms and Imaging", "J. Opt. Soc. Am. A", Oct. 1994, pp. 2622-2626, vol. 11, No. 10, Publisher Optical Society of America, Published in: US.

Zalevsky, et al., "Gerchberg-Saxton Algorithm Applied in the Fractional Fourier or the Fresnel Domain", "Optics Letters", Jun. 15, 1996, pp. 842-844, vol. 21, No. 12, Publisher: Optical Society of America, Published in: US.

O'Brien, et al., "A Holographically Routed Optical Crossbar Using a Ferroelectric Liquid-Crystal Over Silicon Spatial Light Modulator", "Ferroelectrics", 1996, pp. 79-86, vol. 181, Publisher: Overseas Publishers Association, Published in: MY.

Palima, et al., "Holographic Projection of Arbitrary Light Patterns With a Supressed Zero-Order Beam", "Applied Optics", Jul. 10, 2007, pp. 4197-4201, vol. 46, No. 20, Publisher: Optical Society of America, Published in: US.

Zambada, "Holographic Wave Front Optimisation on an Adaptive Optical Free-Space Interconnect, Chapter 7, Experimental Optical Interconnect", "University of Cambridge PhD Dissertation", Jun. 2005, pp. 99-121.

Lohmann, "Image Rotation, Wigner Rotation, and the Fractional Fourier Transform", "J. Opt. Soc. Am. A", Oct. 1993, pp. 2181-2186, vol. 10, No. 10, Publisher: Optical Society of America, Published in: US.

Yang, et al., "Improved Fast Fractional-Fourier-Transform Algorithm", "J. Opt. Soc. Am. A", Mar. 2004, pp. 1677-1681, vol. 21, No. 9, Publisher: Optical Society of America, Published in: US.

Collins, "Lens-System Diffraction Integral Written in Terms of Matrix Optics", "Journal of the Optical Society of America", Sep. 1970, pp. 1168-1177, vol. 60, No. 9, Publisher: The Optical Society of America, Published in: US.

Neil, et al., "New Modal Wave-Front Sensor: A Theoretical Analysis", "J. Opt. Soc. Am. A.", Jun. 2000, pp. 1098-1107, vol. 17, No. 6, Publisher: Optical Society of America, Published in: US.

Blanchard, et al., "Simultaneous Multiplane Imaging With a Distorted Grating", "Applied Optics", Nov. 10, 1999, pp. 6692-6699, vol. 38, No. 32, Published in: US.

Pei, et al., "Two Dimensional Discrete Fractional Fourier Transform", "Signal Processing", 1998, pp. 99-108, vol. 67, Publisher: Elsevier, Published in: US.

O'Brien D C et al, "Dynamic Holographic Interconnects That Use Ferroelectric Liquid-Crystal Spatial Light Modulators", Applied Optics, Optical Society of America, Washington, DC; US, (May 10, 1994), vol. 33, No. 14, doi:10.1364/AO.33.002795, ISSN 0003-6935, pp. 2795-2803, XP000442243.

* cited by examiner

SPACE-DIVISION MULTIPLEXED RECONFIGURABLE, WAVELENGTH SELECTIVE SWITCH

FIELD OF THE INVENTION

This invention relates to optical switching systems and methods, in particular for optical signals which are both space division multiplexed and wavelength division multiplexed.

BACKGROUND TO THE INVENTION

There is a general desire to improve the capacity and performance of switches/routers in optical telecommunication systems. One approach is to employ wavelength division multiplexed (WDM) signals and wavelength selective switches (WSSs); these may be employed in a reconfigurable optical add/drop multiplexer (ROADM) or similar device. Background prior art can be found in U.S. Pat. Nos. 7,397,980 and 8,867,917, and we have previously described techniques for mitigating crosstalk in such devices (our WO2012/123715).

However as part of the drive to increase fibre and switch capacity, space division multiplexing (SDM) as well as wavelength division multiplexing is now being used. Space division multiplexing may be implemented in various ways. In one approach multimode fibre (MMF) is employed which term, as used herein, also encompasses few mode fibre (FMF).

In a single mode fibre (SMF) communication system only light of a single mode (typically the $LP_{01}$ mode) is allowed to propagate, broadly speaking because the fibre has a small core diameter. Multimode fibre (MMF) has a larger core diameter and multiple light beams of different cross-sectional spatial profiles or modes can propagate simultaneously. The different (higher order) modes may be employed for different communications channels to provide mode division multiplexing in combination with wavelength division multiplexing (WDM); dual-polarisation modulation may also be used. MIMO (multiple-input multiple-output) receivers may be employed to recover signals from the different modes, which may couple during propagation though the fibre. Few mode fibres are similar to multimode fibres but only a few modes are permitted to propagate, for example currently of order 10 modes, for example by restricting the core dimension and/or numerical aperture.

Space division multiplexing (SDM) using multimode fibres (MMFs) has been proposed as a potential technique to overcome the capacity limit of WDM networks based on single mode fibres (SMFs). This technique may be used for optical communications in both the telecomm networks and datacentres. One of its attractions is the possibility of a capacity increase using existing MMFs that have been previously deployed in a telecomm network/datacentre.

In another approach to space division multiplexing (SDM) multicore fibre (MCF) may be employed. In this approach broadly speaking the fibre comprises an array of cores. The cores may or may not be strongly coupled; they may comprise single mode cores or, in a hybrid MCF-MMF fibre, multiple multimode cores may be provided. In principle there are also other ways to achieve space division multiplexing, for example by employing photonic band gap fibre or hollow core fibre (HCF). In this latter approach light is guided by, for example, an array of hollow cores which act as a photonic crystal, though at present these techniques are used at longer wavelengths than the usual C-band (1530-1565 nm).

One problem with using conventional wavelength selective switches (WSSs) to route signals carried by MMFs is that the different modes of a MMF propagate differently after entering the free-space optics of a conventional WSS. As a result the beams of the different modes have different shapes on the switching plane (that is, on the Liquid Crystal on Silicon (LCOS) plane), which leads to passband distortion for higher order modes, affecting the signal quality. FIG. 1a shows the minimum and maximum transmission of a passband and its neighbouring channel; the solid lines show the passbands for a SMF-WSS. The modal dependence of the passband shapes requires wider spectral guard-bands between channels, and physically larger phase patterns, which reduces the number of wavelength channels in a MMF/FMF WSS as compared with a SMF WSS, and the total switch capacity is reduced.

To address this, a photonic lantern (PL) may be employed. This is an optical waveguide device that provides a low-loss transformation of a multimode waveguide into a plurality of single mode waveguides, and vice-versa and as such can be used as a mode (de)multiplexer for MMF. An example is shown in FIG. 1b. This has a MMF core at one side and a plurality of SMF cores at the other side; the number of SMF cores may equal the number of modes in the MMF.

A wavelength selective switch (WSS) which may use a photonic lantern is described in US2015/0085884 Fontaine et al. FIGS. 1c and 1d, which are taken from US'884, show the principle of operation of the device, illustrating a 1×2, 3-mode fibre WSS—that is a WSS with one 3-mode input and two 3-mode outputs. As illustrated in FIG. 1c, 3 modes of a fibre provide inputs to three ports of a conventional 1×2 WSS. The beams of these 3 modes propagate through free-space optics onto a MEMS (Micro Electro Mechanical System) mirror, and may be directed to a selected output were they are multiplexed into another 3-mode fibre. The example of FIG. 1d re-maps the modes so that a reduced steering angle is needed for the MEMS mirror.

Similar systems are described in papers by Fontaine and his co-workers, for example: N. K. Fontaine et at, "Few-Mode Fiber Wavelength Selective Switch with Spatial-Diversity and Reduced-Steering Angie," in *Optical Fiber Communication Conference*, OSA Technical Digest (online) (Optical Society of America, 2014), paper Th4A.7; N. K. Fontaine et al. "Heterogeneous Space-Division Multiplexing and Joint Wavelength Switching Demonstration," in *Optical Fiber Communication Conference Post Deadline Papers*, OSA Technical Digest (online) (Optical Society of America, 2015), paper Th5C.5; Ryf et al., "Wavelength-selective Switch for Few-mode Fiber Transmission", 39th European Conference and Exhibition on Optical Communication (ECOC 2013), 2013 p. 1224-1226; WO2014/141281 Marom; background material can also be found in J. Carpenter et al., "1×11 few-mode fiber wavelength selective switch using photonic lanterns," Opt. Express 22, 2216-2221 (2014).

However the WSS of Fontaine et al. suffers from lack of scalability: For example assuming one has a 1×18 SMF-WSS, which is already large by today's standards, one can only construct a 1×6 3-mode-fibre-WSS. If one wanted to use 6-mode fibres to further increase the transmission capacity such a 1×18 SMF-WSS would only provide a 1×3 6-mode-fibre-WSS. There is therefore a need for improved techniques.

SUMMARY OF THE INVENTION

According to the present invention there is therefore provided a space-division multiplexed (SDM), reconfigurable, wavelength-selective switch (WSS), the switch comprising: a space-division multiplexed (SDM) optical input port to receive a space-division multiplexed (SDM) optical input signal comprising a plurality of space division modes each of said space division modes carrying a respective data signal, wherein each of said space division modes is also wavelength division multiplexed (WDM); an optical space division demultiplexer, coupled to said input port, to split said space-division multiplexed (SDM) optical input signal into a plurality of space division demultiplexed optical signals on separate demultiplexer outputs of said demultiplexer, each said demultiplexer output of said demultiplexer comprising a wavelength division multiplexed one of said plurality of space division modes; a set of reconfigurable wavelength-selective optical switches, each reconfigurable wavelength-selective optical switch having a switch input and a set of N switch outputs, and each including a dispersive element and a controllable beam steering element such that each said reconfigurable wavelength-selective optical switch is reconfigurable to selectively direct different respective wavelengths of a WDM optical signal at said switch input to different selected outputs of said set of N switch outputs, and wherein each said demultiplexer output is coupled to said switch input of a respective one of said set of reconfigurable wavelength-selective optical switches; and a set of optical space division multiplexers, one for each of said N switch outputs, each said optical space division multiplexer having a set of multiplexer inputs and a multiplexer output, to re-multiplex optical signals at said multiplexer inputs into a space-division multiplexed optical output signal at said multiplexer output, and wherein, for each of said set of optical space division multiplexers, each multiplexer input of said set of multiplexer inputs is coupled to said switch output of a different respective one of said set of reconfigurable wavelength-selective optical switches.

Embodiments of the architecture facilitate the implementation of a WSS capable of handling a relatively large number of modes in combination with a relatively high port count. Broadly speaking, in embodiments the SDM input is demultiplexed and then switched by a stack of wavelength selective switches, each dedicated to a particular spatial mode of the optical input. One output of each of the wavelength selective switches goes to each re-multiplexer so that the different spatial modes may once again be recombined and provided as an SDM optical output. In embodiments there is a set of multiplexers and a set of multiplexer outputs, each output providing a SDM signal at a different respective wavelength. The set of wavelength selective switches allows different wavelengths to be routed to different multiplexer outputs according to the switch configuration. Preferably, however, a set of space division modes at any particular wavelength is kept together because signals from different spatial modes can often interact/interfere, effectively partially mixing the modes. Thus keeping the modes together facilitates separating out at a later stage signals originally modulated onto the different modes.

Embodiments of the SDM reconfigurable WSS switch include one or more controllers to control the set of wavelength-selective optical switches to direct the same selected wavelength for each mode to a common respective multiplexer. Different respective wavelengths are routed to different respective ones of the set of optical space division multiplexers. A separate controller may be provided for each one of the set of wavelength-selective optical switches and operated in coordination, or a single controller may be used to control the set of switches. As previously mentioned, each multiplexer receives a different mode from each different switch to which it is coupled.

The input space division multiplexed optical signal may be a multimode signal and/or a signal from a multicore SDM fibre. Generally the outputs will provide an SDM signal in the same SDM format as the optical input, but in principle different multiplexing formats may be employed—for example, the input may be from a multimode fibre and the outputs may be to multicore fibres, or vice versa. As the skilled person will be aware, in a multicore fibre in principle the different cores may carry multimode optical signals.

In this specification references to multimode fibre (and the like) include references to few mode fibre (and the like).

Where the optical input comprises a multimode fibre input port this may be coupled to a photonic lantern to demultiplex the modes. Additionally or alternatively however, an optical mode division demultiplexer may comprise a Multi-Plane Light Convertor (MPLC). The MPLC may comprise an optical path including a plurality of phase profiles and optical space-frequency transforms to convert between a multimode SDM optical signal and a plurality of separate (orthogonal) mode optical signals.

Additionally or alternatively, where multicore fibre is employed, a demultiplexer may route the separate cores of the multicore fibre to separate outputs of the demultiplexer. Thus a multicore demultiplexer may comprise a fan-out optical coupler to couple between the multicore fibre and a plurality of separate optical paths for respective cores of the multicore fibre. A fan-in optical coupler may be employed as a multiplexer.

The skilled person will appreciate that an optical demultiplexer as described above may be employed in reverse as an optical multiplexer. Multicore and multimode fibre demultiplexers or multiplexers may be employed in series to demultiplex/multiplex multimode multicore fibre.

In some preferred embodiments each reconfigurable wavelength-selective optical switch may be of the general type described below under the heading "Wavelength selective switches". Thus in embodiments the controllable beam steering element may comprise a reconfigurable holographic array on an optical path between the switch input ports and the N switch outputs. The switch may also include at least one diffractive element on an optical path between the switch input and the reconfigurable holographic array. The diffractive element may be configured to demultiplex a wavelength division multiplexed space division mode of the optical input signal into a plurality of wavelength-demultiplexed optical channels, typically beams, and to disperse the wavelength-demultiplexed optical channels spatially along a first axis on the reconfigurable holographic array. In embodiments the reconfigurable holographic array may thus comprise an array of configurable sub-holograms, the array extending along this first axis, each sub-hologram being configured to direct a wavelength-demultiplexed optical channel to a (selected) respective switch output.

In a related aspect the invention provides a method of switching a set of optical input signals wherein the optical input signals are both space-division multiplexed (SDM) and wavelength-division multiplexed (WDM), the method comprising: receiving an optical input signal comprising a plurality of space division modes, wherein at least some of said space division modes are also wavelength division multiplexed; demultiplexing a space-division multiplexed (SDM) part of said optical input signal into a plurality of space division demultiplexed optical signals each comprising a wavelength division multiplexed one of said plurality of space division modes; providing each wavelength division multiplexed (WDM) space division mode to a respective reconfigurable wavelength-selective optical switch having a plurality of switch outputs, one for each wavelength of said wavelength division multiplexed space division mode such that each optical switch is configured to switch one of said space division modes; re-multiplexing said switch outputs using a plurality of re-multiplexers such that each re-multiplexer re-multiplexes one switch output of each optical switch; and selectively directing different respective wavelengths of each WDM space division mode of said optical input signal to said switch outputs, in coordination such that each said re-multiplexer receives the same wavelength and a different one of said plurality of space division modes.

In preferred embodiments of this method, each optical switch has N switch outputs and the ith respective switch output of each optical switch is coupled to the same re-multiplexer (where ith is arbitrary but labels the corresponding output of each switch). The method may then control the switches in coordination such that the same wavelength of each of the space division modes is routed to the same ith switch output for re-multiplexing. For example, each switch output 1 may go to multiplexer 1, each switch output 2 may go to multiplexer 2 and so forth. Then the switches may be controlled in coordination so that the same wavelength, for example $\lambda_p$ goes to the same selected output of each switch, for example output q, and hence to the same multiplexer, for example multiplexer q. As previously described, the space division modes may comprise modes of a multimode and/or multicore fibre.

The skilled person will appreciate that the above described SDM fibre reconfigurable wavelength-selective switch may be operated in reverse, that is so that the outputs are used as inputs and so that the input becomes an output, to provide a controllable multimode multiple wavelength multiplexer.

Thus in a further related aspect the invention provides an optical system comprising: a set of optical inputs each to receive a space-division multiplexed (SDM) optical input signal at a different respective wavelength, each said optical input signal comprising a plurality of space division modes, each of said space division modes carrying a respective data signal; a combined optical signal output; a set of optical space division demultiplexers, one for each of said different respective wavelength, each demultiplexer coupled to a respective said optical input to split the SDM optical input signal at the respective said optical input into a plurality of space division demultiplexed optical signals at the same wavelength on separate demultiplexer outputs of the demultiplexer, wherein each of said plurality of space division demultiplexed optical signals comprises a different respective space division mode of said plurality of space division modes; a set of reconfigurable optical switches, one for each of said plurality of space division modes, each reconfigurable optical switch having a set of N switch inputs and a common switch output, wherein, for each said demultiplexer, each one of said demultiplexer outputs is coupled to a different respective one of said optical switches; and wherein each optical switch includes a dispersive element and a controllable beam steering element such that each said optical switch is reconfigurable to selectively direct a different respective wavelength from each of said demultiplexers to the common switch output of the optical switch, each said optical switch being configured to process one of said plurality of space division modes; and a re-multiplexer having a set of re-multiplexer inputs each coupled to said common switch output of a respective one of said reconfigurable optical switches, and having a re-multiplexer output coupled to said combined optical signal output, to re-multiplex said plurality of space division modes from said set of reconfigurable optical switches for output.

Wavelength Selective Switches

In co-pending PCT patent application PCT/GB2016/052912 (hereby incorporated by reference), we describe a wavelength division multiplexed (WDM) reconfigurable optical switch, and other related WDM systems and methods, using which embodiments of the previously described invention may advantageously be implemented.

Thus we also describe a WDM switch, which may be used in embodiments of the above described space-division multiplexed (SDM) fibre, reconfigurable, wavelength-selective switch (WSS). The WDM switch may comprise: a set of arrays of optical beam connections, each comprising an array of optical outputs and having an optical input to receive a WDM input optical signal; a (first) diffractive element to demultiplex said WDM input optical signal into a plurality of demultiplexed optical input beams, and to disperse said demultiplexed optical input beams spatially along a first axis; first relay optics between said set of arrays of optical beam connections and said first diffractive element; and a reconfigurable holographic array comprising a 2D array of reconfigurable sub-holograms defining sub-hologram rows and columns; wherein said arrays of said set of arrays are at least one dimensional arrays extending spatially in a direction parallel to said first axis and arranged in a column defining a second axis orthogonal to said first axis; wherein said sub-hologram rows are aligned along said first axis, and wherein said sub-hologram columns are aligned along said second axis; wherein a number of said sub-hologram rows corresponds to a number of arrays in said set of arrays; and wherein each sub-hologram row is configured to receive a set of demultiplexed optical input beams at different carrier wavelengths demultiplexed from the optical input for the array of the set of arrays to which the row corresponds; wherein each of said sub-holograms in a sub-hologram row is reconfigurable to steer a respective wavelength channel of the WDM input signal for the array to which the sub-hologram row corresponds, towards a selected said optical output for the array; and wherein each said sub-hologram row is configured to steer the demultiplexed optical input beams for a respective array of the set of arrays of optical beam connections.

Embodiments of such an arrangement can substantially increase the data handling capacity of an optical switch. Although tiling a spatial light modulator (SLM) with a 2D array of relatively small holograms might appear to result in a loss of resolution in the output image plane, in fact the resolution can effectively be maintained if the spacing of the points in the output image plane is relatively smaller—that is, if in embodiments, the optical outputs are relatively close together. In general it is preferable though not essential to include further measures to reduce crosstalk, and we describe later techniques by which crosstalk can be mitigated.

In embodiments the arrays of optical outputs are at least one dimensional arrays extending parallel to the first axis (of wavelength dispersion), and a system of this type can, for example, be implemented on a planar or substantially planar optical circuit or substrate. However in preferred embodiments the arrays of optical outputs are 2D arrays (that is, the outputs are arranged over a region extending over in two dimensions), and each of a sub-holograms steers one of the demultiplexed beams in two dimensions towards the selected optical output for the wavelength/array.

In some preferred embodiments the switch has a folded optical configuration—that is the optical path between the inputs and outputs of the arrays includes a reflecting element. Typically this may be provided by employing a reflective SLM for the reconfigurable holographic array, for example an LCOS (liquid crystal on silicon) SLM. In such an arrangement preferably, though not essentially, the optical input of an array is co-planar with the optical outputs of the array, and forms part of, for example, a rectangular, square or hexagonal grid of the array. In other embodiments, however, the switch may be 'unfolded' and a transmissive SLM used for the reconfigurable holographic array. In this latter case a further diffractive element may be provided on the output side of the holographic array, and further relay optics may be employed to couple the output side to the optical outputs of the switch.

In embodiments the input/output (I/O) plane of the switch may be provided by a set of clusters of input/output ports. In embodiments these clustered ports may define a hexagonal array or grid, which is particularly convenient for interfacing to multicore optical fibre, and hence for providing compact, high-density optical signal processing.

In broad terms each array of I/O ports maps onto a row of the reconfigurable holographic array, each row performing 2D steering for one of the arrays of the set of arrays. More particularly this may be achieved by using the diffractive element to provide dispersion along a row, so that the different wavelengths of the WDM signals are each provided to a separate sub-hologram. A sub-hologram may then display a grating appropriate to the wavelength and to the 2D direction in which the (de-multiplexed) beam is to be steered. As the skilled person will appreciate, in embodiments the sub-holograms of the array may be determined by notionally subdividing a relatively high resolution SLM into sub-holograms by displaying an appropriate phase pattern on each region of n by m pixels. With such an approach the size/shape of a sub-hologram may be flexible, for example depending upon the bandwidth or data rate associated with a particular wavelength channel. For example within, say, C-band, a particular channel may be allocated twice the usual data rate and twice the usual bandwidth, in which case the sub-hologram associated with that wavelength/channel may have twice the width (along the direction of a row). In this way the optical configuration we describe enables the switch to be adaptive to the particular data rates used on the channel.

As the skilled person will appreciate, modulation of a wavelength channel of the input optical beam will result in a beam with an elongate shape when the multiplexed signal is demultiplexed by the diffractive element. The cross-section of a de-multiplexed beam is thus elongated, in particular with a long axis lying along the above described first axis. Thus in embodiments the steering, in preferred embodiments in two dimensions, comprises deflecting such a demultiplexed optical input beam in a direction parallel to this axis (as well as orthogonal to this axis, depending upon the particular direction needed for the selected optical output).

In embodiments the SLM employed may be a high-resolution LCOS SLM, for example having a resolution of one to a few thousand pixels (or higher) in each direction. Individual sub-holograms may, however, be relatively small, for example of order 50×50 pixels say, in the range 20 to 200 pixels on each side (in embodiments the sub-holograms may be substantially square in terms of pixel count and/or physical dimensions). In embodiments a sub-hologram pixel may be able to display, 64, 128 or more phase levels. In preferred embodiments of the systems described herein the hologram is a phase hologram or kinoform.

In some embodiments of the switch the relay optics may include non-telecentric optics such that output beams from the holographic array, as they propagate towards the output arrays, define directions which diverge away from an optical axis of the switch. Thus in some embodiments of the optical switch the optical input of an array defines an input axis and a steered output beam from the relay optics, directed towards an optical output of the array, has an axis which diverges away from this input axis (in a direction of light propagation from the optical output). Thus in broad terms in such embodiments the output beams diverge away from an optical axis of the switch. Optionally the optical outputs of an array of optical beam connections may then also have axes which (each) diverge away from the optical axis or, for example, a lens (lenslet) array may be used to couple, more particularly focus, into an array of optical beam connections. In this latter case the lenslets may be offset to direct the output beams to afterwards lie substantially parallel to the optical axis. These techniques can help to reduce crosstalk in the system.

In other embodiments the switch may additionally incorporate telecentric magnification optics to provide the output beams with increased mutual spatial separation. In such embodiments the system may have a virtual output array plane, in particular to provide a virtual image of the set of arrays of optical beam connections. The telecentric magnification optics may then be provided between this virtual output array plane and the actual optical beam connections. Preferably in such an arrangement a further lens or lenslet array is provided between the magnification optics and an array of optical outputs, to couple, more particularly focus, the magnified (and hence more spatially separated) beams into the output array.

In these and other embodiments a lenslet array may also be included prior to the (input/)output ports (fibre array) in the optical path to compensate for varying beam diffraction angles (angles $\varphi(\theta'(p))$ later). Where output to fibre array is employed (the output ports comprise or consist of a fibre array), in particular where the fibre axes are parallel to the optical axis, for example if a multicore fibre is used, a single lenslet may be provided (fabricated) on the end of each fibre.

Additionally or alternatively the input axis may be tilted with respect to an optical axis of the system, more particularly with respect to an optical axis of the reconfigurable holographic array, so that a zeroth order beam reflected from the holographic array avoids re-entering the optical input. This helps to avoid the need for input port isolation (to mitigate back-reflections). In embodiments where the optical input is part of the same array as the optical outputs, typically the case for a reflective SLM/folded optical system, the optical input may be offset from the centre of the array. Then, in embodiments, the zeroth order beam may be dumped, for example into an unused optical output, which may be at the centre of the array.

As previously described, in some preferred implementations each sub-hologram defines a phase grating, configured to direct light of the wavelength band selected by the position of the sub-hologram in its row towards a selected optical output of the array of optical outputs. Thus in preferred embodiments the system includes a driver coupled to the SLM to drive the SLM with an appropriate set of sub-holograms according to the selected outputs for the various different wavelength components of the inputs. Since a relatively small number of holograms/gratings is needed, optionally these may be pre-calculated and corresponding phase data stored in non-volatile memory, so that a particular hologram/grating may be selected as needed. In embodiments the driver includes a processor to receive switch control data defining which wavelengths are to go to which outputs, and the processor then selects holograms for display accordingly. Such a processor may be implemented in software, or in hardware (for example as a gate array or ASIC), or in a combination of the two.

Although the individual sub-holograms may in principle be simple gratings, optionally they may also incorporate phase information for wavefront modification/correction. For example optical distortion within the switch could be measured (either for a reference device or for each individual device) and at least partially corrected in the displayed hologram data. Crosstalk may be mitigated in a similar manner. Additionally or alternatively crosstalk may be reduced by the techniques we have previously described in WO2012/123715 (hereby incorporated by reference in its entirety). In broad terms the switch may deliberately incorporate a "distorting" optical element, for example an element which provides defocus (say an axicon). Then this distortion or defocus may be corrected in a displayed sub-hologram so that a particular, selected diffraction order (such as +1 or −1) is corrected, to reduce the coupling of one or more other unwanted diffraction orders into an optical output other than the selected optical output (which can otherwise be a particular problem where the outputs are regularly spaced).

Embodiments of the above described system can be employed to direct a selected wavelength of a WDM signal to a selected optical output of the switch. In this regard it may be thought of as a form of demultiplexer. In a corresponding manner the optical paths through the device may be reversed so that the switch can operate as a multiplexer or combiner.

Thus in a complementary aspect the invention provides a reconfigurable optical switch, the switch comprising: a set of arrays of optical beam connections, each having an optical output to provide a WDM output optical signal and comprising an array of optical inputs, each to receive an input beam of a different centre wavelength; a first diffractive element to disperse input beams from said set of arrays spatially along a first axis; first relay optic between said set of arrays of optical beam connections and said first diffractive element; a reconfigurable holographic array comprising an array of reconfigurable sub-holograms defining sub-hologram rows and columns; wherein said arrays of said set of arrays are at least one dimensional arrays extending spatially in a direction parallel to said first axis and arranged in a column defining a second axis orthogonal to said first axis; wherein said each sub-hologram rows are aligned along said first axis, and wherein said sub-hologram columns are aligned along said second axis; wherein a number of said sub-hologram rows corresponds to a number of arrays in said set of arrays; wherein each sub-hologram row is configured to receive said dispersed input beams from one of said arrays of optical inputs; and wherein each of said sub-holograms in a sub-hologram row is reconfigurable to steer a respective input beam, in one or preferably two dimensions, towards the optical output of the array to which the sub-hologram row corresponds.

Again the switch (multiplexer or combiner) preferably has a folded configuration, for example employing a reflective SLM to display the reconfigurable holographic array. However the skilled person will appreciate that it may equally be operated in an unfolded configuration, for example using a transmissive SLM.

In a similar manner to that previously described, each incoming wavelength from each array of inputs has its own sub-hologram which is configured to steer that wavelength, from the particular input to the common output for the array (which may or may not be a central output, as previously described).

A WDM reconfigurable optical switch with multiple arrays of optical outputs may be combined with a multiplexer/combiner as previously described to provide what is here referred to as an optical router. This, in embodiments, enables any wavelength at any input to be routed to any selected output.

This can be achieved, in broad terms, by connecting each optical output of each array from the switch to each optical input of each array of the multiplexer/combiner. Thus the switch can then be used to direct a selected wavelength to a selected output of the router by choosing the optical output of the switch to which it is directed. The coupling between the switch and the multiplexer combiner involves connecting each output of each array from the switch to each input of each array of the multiplexer/combiner, and this may be done in a number of different ways. For example in one approach a network of fibre optic connections is used, which may be referred to as a 'fibre shuffle network'. Alternatively the connections may be made using fibres or free-space optics. In a yet further approach the optical outputs may be arranged so that they are all substantially planar, and the connections made using a planar 'lightwave circuit'.

In a related aspect, therefore, the invention provides a WDM reconfigurable optical router comprising a WDM reconfigurable optical switch as described above, and additionally: a second set of arrays of optical beam connections, each having an optical output to provide a WDM output optical signal and comprising an array of optical inputs; wherein each optical input of said second set of arrays is optically coupled to an optical output of said set of arrays of said switch; a second diffractive element to disperse input beams from said second set of arrays spatially along a third axis; second relay optics between said second set of arrays of optical beam connections and said second diffractive element; a second reconfigurable holographic array comprising an array, preferably a 2D array, of reconfigurable sub-holograms defining second sub-holograms rows and columns; wherein said second sub-hologram rows are aligned along said third axis and wherein each second sub-hologram row is configured to receive said dispersed input beams from one of said second set of arrays; and wherein each of said sub-holograms is a second sub-hologram row is reconfigurable to steer, preferably but not essentially in two dimensions, a respective input beam towards the optical output of an array of the second set of arrays to which the second sub-hologram row corresponds.

The invention also provides a method of switching a set of wavelength division multiplexed (WDM) optical signals, the method comprising: providing a set of optical port arrays each comprising an input port to receive a WDM optical input and a set of output ports; wherein said port arrays are spatially dispersed along a second axis and said output ports of said port arrays extend at least along a first axis orthogonal to said second axis; providing light from said input ports of said port arrays to a diffractive element to disperse wavelengths of said WDM optical signals along said first axis orthogonal to said second axis to demultiplex said WDM optical signals; providing said demultiplexed optical signals to a reconfigurable holographic array comprising a 2D array of reconfigurable sub-holograms defining sub-hologram rows aligned with said first axis and sub-hologram columns aligned with said second axis such that each sub-hologram row corresponds to a said port array; and steering said demultiplexed optical signals using said reconfigurable holographic array such that each row of sub-holograms steers a set of demultiplexed wavelengths from a said array input port to a set of selected output ports of the array, and such that a set of said rows of the reconfigurable holographic array steers the demultiplexed wavelengths of said set of port arrays.

Again as previously described, in some preferred embodiments the fibre arrays, more particular the output ports of the fibre arrays, extend in two dimensions, that is along each of the first and second axes, and the sub-holograms steer the demultiplexed optical signals in two dimensions towards the selected output ports. However in other embodiments a fibre array, more particularly a set of output ports of a fibre array, may only extend along the first axis, that is in a direction of wavelength dispersion by the diffractive element, and the sub-holograms may then steer the demultiplexed optical signals by deflecting the demultiplexed beams parallel to this direction, more particularly deflecting the beams in a plane comprising this direction. Embodiments of this latter type may be useful, for example, for implementation on a substantially planar substrate.

As previously described, in some embodiments of the method optical axes of the output beams (or ports/fibres) may be tilted with respect to an optical axes of the input port of the fibre or other arrays (although each array may still share a lenslet). In embodiments this helps to reduce crosstalk and to increase diffraction efficiency. Additionally or alternatively in embodiments the input port may be offset from a centre of an array. Then a zeroth order reflection from the reconfigurable holographic array may be captured or dumped, for example in an unused output port of the array. These techniques generally facilitate the use of an array of sub-holograms, which tend to have a reduced range of angular deflection resulting in a more tightly packed holographic replay field.

In some embodiments the output ports of an array are arranged in a hexagonal close-packed configuration, which again facilitates efficient operation, as well as convenient coupling to a multicore fibre.

Again as previously described the number of sub-holograms in a row may be adapted, in embodiments in real time, to the bandwidth(s) of the signals within the WDM optical signal. Optionally, again, suitably sized sub-holograms may be precalculated and stored in non-volatile memory. In general steering using the reconfigurable holographic array comprises defining a set of gratings, more particularly phase gratings, on a spatial light modulator, preferably a reflective SLM such as an LCOS SLM. Typically a single grating is displayed for each sub-hologram.

As previously described, the method may be used 'in reverse' so that the input port of an array becomes an output port and so that the output ports become input ports, to provide a method of multiplexing or combining optical signals. This method may then be concatenated with the method switching optical signals described above, by connecting each output port to a respective input port of the next stage. This combination may then be employed as a method of N by N routing of N optical signals each with a plurality (C) of different wavelengths, where C may but need not necessarily equal N.

Thus in embodiments the above described method further comprises providing a second set of optical port arrays, each comprising an output port and a set of input ports, wherein said second set of optical port arrays is spatially dispersed along a fourth axis; coupling each set of output ports of said set of port arrays to said input ports of said second set of port arrays; providing light from said input ports of said second set of port arrays to a diffractive element to provide dispersion along a third axis orthogonal to said fourth axis; providing said dispersed light from said input ports of said second set of port arrays to a second reconfigurable holographic array comprising a 2D array of reconfigurable sub-holograms defining sub-holograms rows aligned with said third axis and sub-hologram columns aligned with said fourth axis; and steering the dispersed light from each input port of a port array of the second set of port arrays, in two dimensions using said second reconfigurable holographic array, towards the output port for the port array.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

We first describe some examples of stacked WDM wavelength selective switches, embodiments of which are particularly useful for implementing preferred embodiments of the invention.

Thus referring to FIG. 2, this shows a WDM reconfigurable optical switch 100 according to an embodiment of the invention. As illustrated the switch comprises a set of M arrays of input/output ports $S_1 \ldots S_3$, of which three are shown in the Figure. In the illustrated embodiment each array of ports comprises a fibre array as shown in FIG. 2c. Each array comprises an input (fibre) 102 and a set of outputs (fibres) 104, in the illustrated example on a regular square grid with spacing $Y_f$ (although in other embodiments a rectangular or hexagonal grid may be employed). As illustrated the array comprising the output fibres 104 also includes the input fibre 102, but it will be appreciated that the arrangement of FIG. 2 may be unfolded to have the input at one end and the outputs at the other end of the switch. In the illustrated example each array $S_i$ is a 3×3 array with one input and eight outputs, to therefore implement a 1×8 or 8×1 wavelength selective switch (WSS)—although it will be appreciated that other numbers of input/output ports may be employed.

As illustrated in FIG. 2 preferably, though not essentially, the fibre arrays $S_1$, $S_2$ and $S_3$ are regularly (uniformly) spaced in the y-direction; in the illustrated example M=3. In the illustrated embodiment the input and output ports lie in a common plane $P_i$. Again this is convenient but not essential since, for example, the holograms displayed on the spatial light modulator (described later) may incorporate focussing power. Thus in other arrangements, for example, the ports may be staggered in the z-direction and a displayed sub-hologram may incorporate focusing power to focus an output beam on a selected output port—which may be helpful to mitigate crosstalk.

An array of M objective lenses $L_A$ is provided on the same pitch as the input/output port arrays. These may be provided by a lenslet array. In embodiments these lenses each have substantially the same focal length $F_A$, but again this is not essential. In embodiments light from an input port 102 of, for example, a cluster of fibres is collimated by the corresponding objective lenslet of array $L_A$ at plane $P_0$. Thus, for example, an objective lenslet may expand the input mode field radius from, say, around 5 µm to around 50 µm beam waist, to cover a useful area of a sub-hologram for efficient diffraction. In FIG. 2 the terms $z_1$ and $z_2$ are the distance from the fibre array to the lenslet array, and the distance from the lenslet array to plane $P_o$ respectively, and plane $P_o$ is the plane at which the relay system images the SLM plane.

Figure 1A:
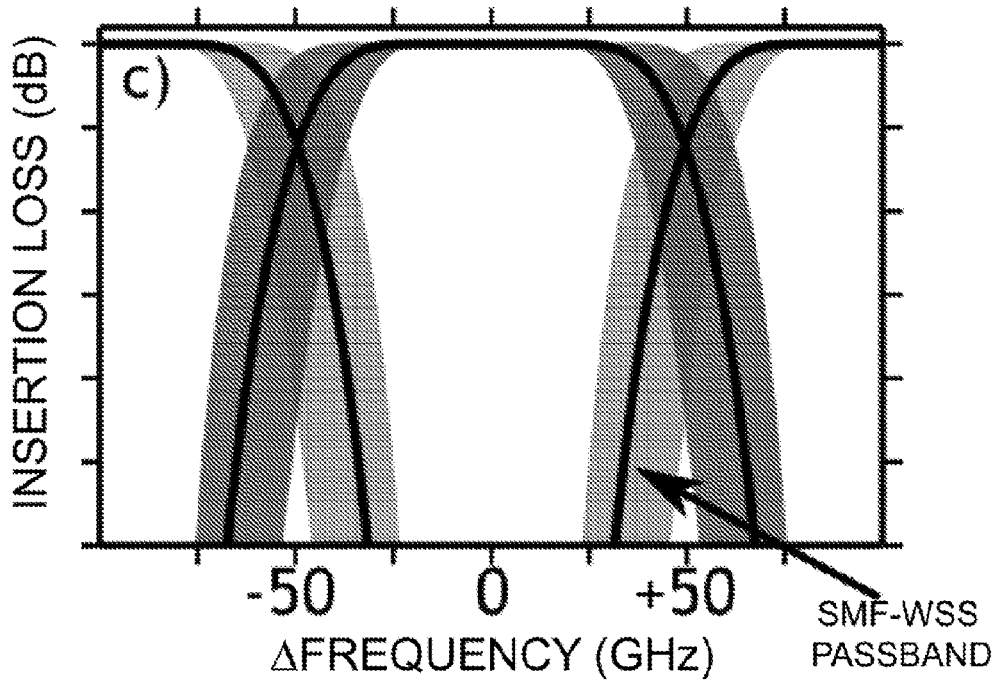
FIGS. 1a to 1d show, respectively, mode-dependent passbands of a WSS illustrating minimum and maximum transmission (the solid line shows the passband for a SMF-WSS); an example photonic lantern, usable as a mode (de)multiplexer; and first and second examples of a multimode WSS according to the prior art.
Figure 1B:
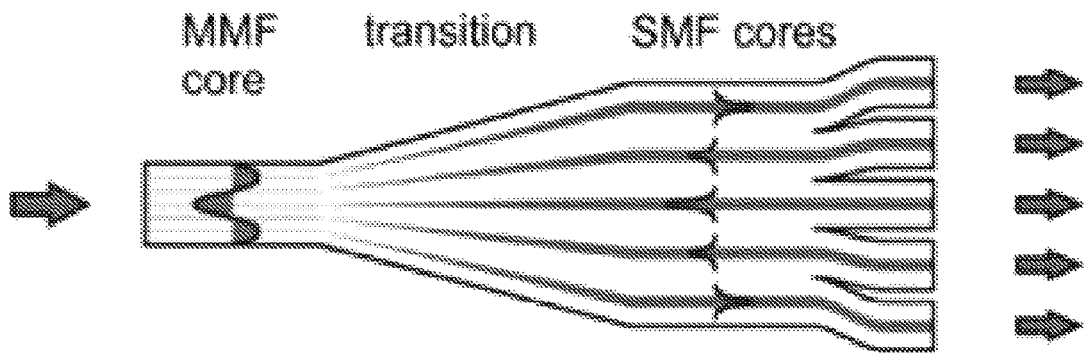
Figure 1C:
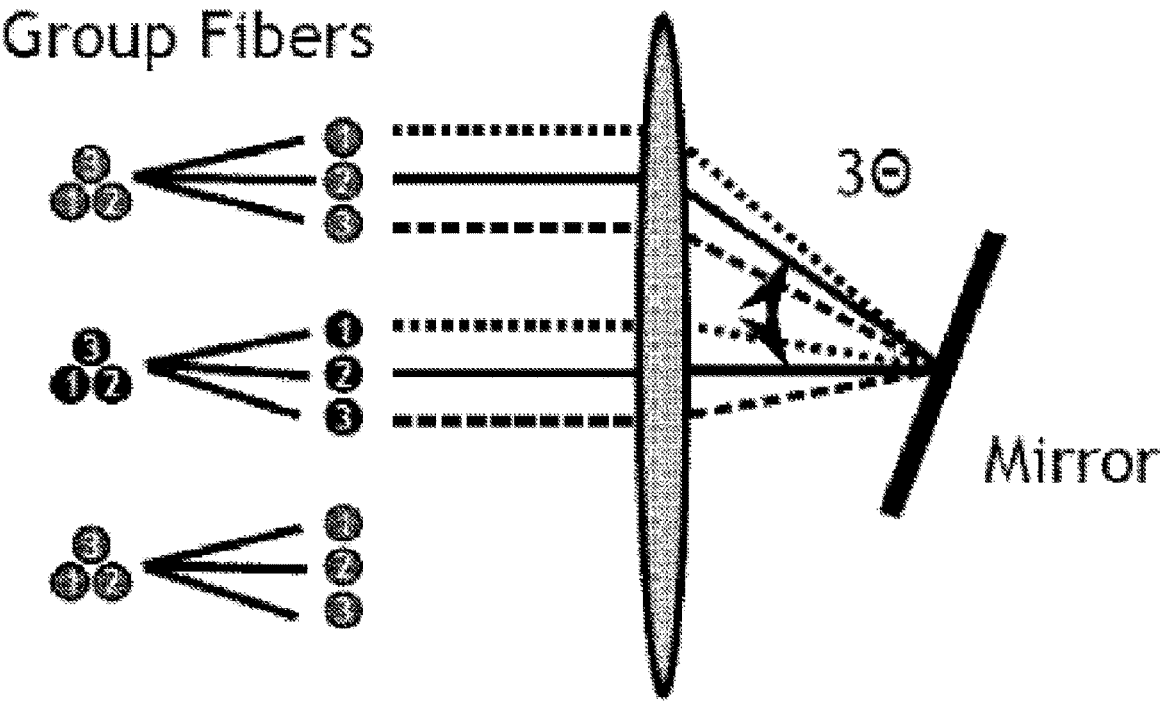
Figure 1D:
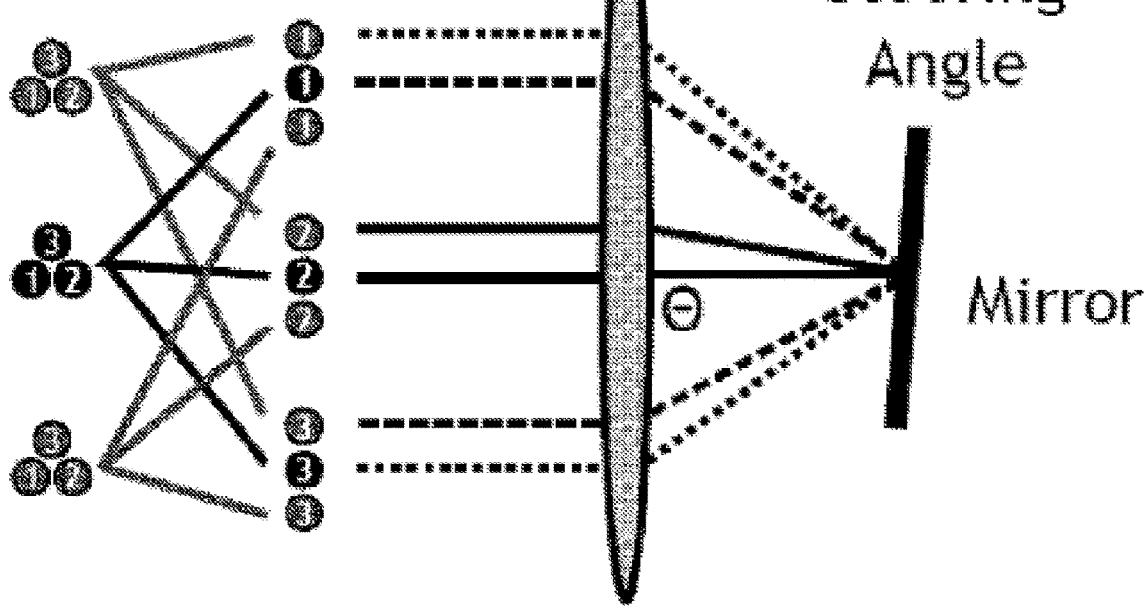
Figure 2A:
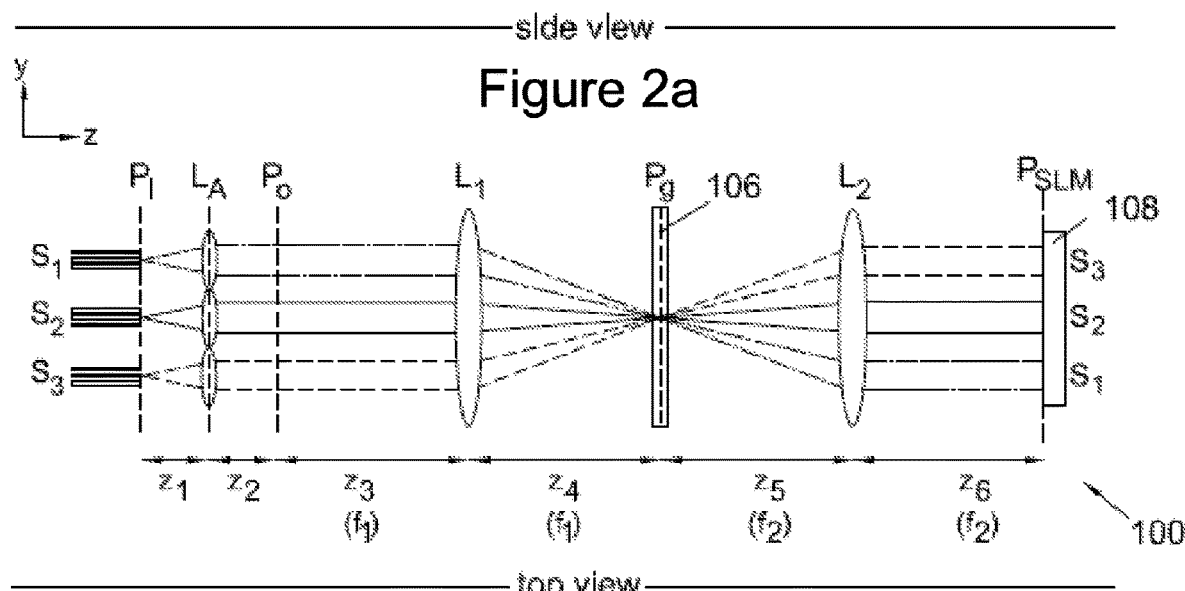
FIGS. 2a to 2d illustrate an embodiment of a wavelength division multiplexed (WDM) reconfigurable optical switch according to the invention illustrating, respectively, a side view of the switch, a top view of the switch, an array of input/output ports for the switch, and an illustration of the disposition of a 2D array of reconfigurable sub-holograms for the switch.
Figure 2B:
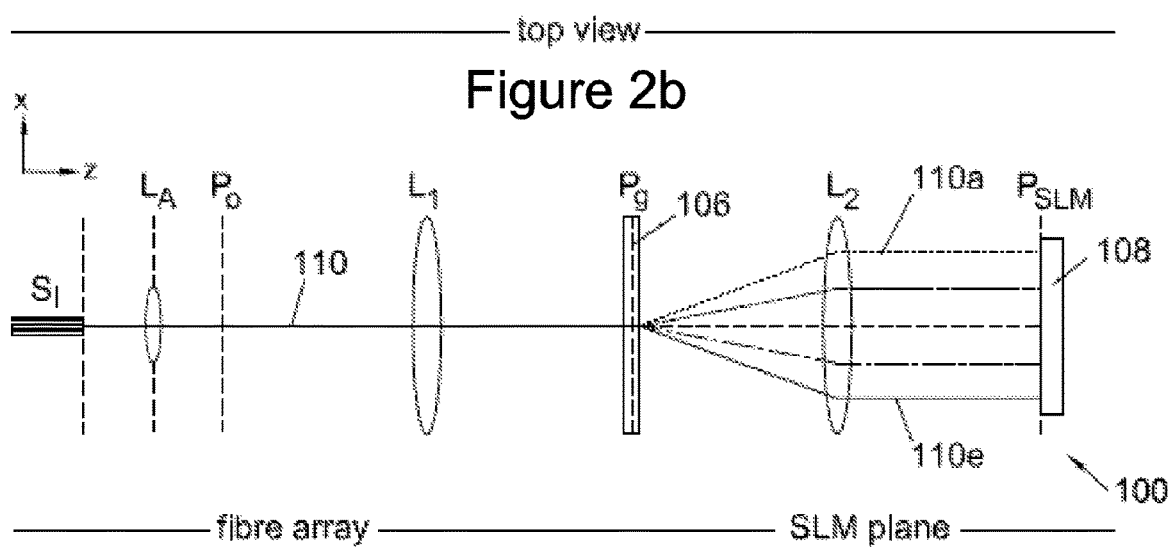

In the illustrated embodiment the system includes relay optics $L_1$, $L_2$ to either side of a grating 106 (at plane $P_g$), to image plane $P_0$ at the plane of a spatial light modulator (SLM) 108, $P_{SLM}$), and vice versa. As illustrated lenses $L_1$, $L_2$ comprise a 4f relay system which images plane $P_0$ onto the SLM via a static diffractive element 106. In the illustrated embodiment this comprises a static grating which demultiplexes the WDM input signals into a plurality of demultiplexed wavelengths, spectrally dispersing the input wavelengths across the SLM plane in the x-direction. This is illustrated in FIG. 2b where an input beam 110 is demultiplexed into a set of beams 110a-110e at different wavelengths, which illuminate separate sub-holograms on SLM 108 that independently steer each beam angularly in two dimensions.

Figures 2C, 2D:
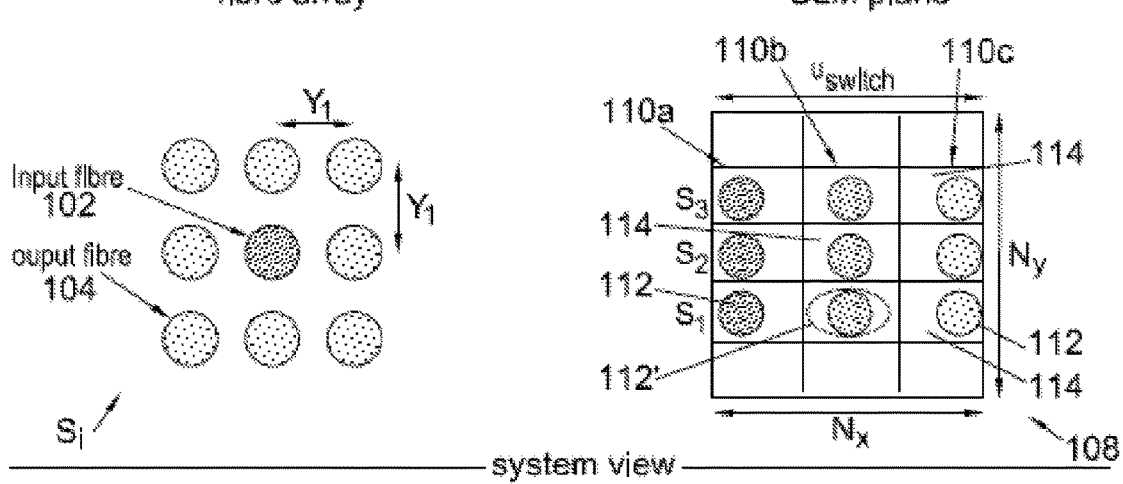

In embodiments the SLM 108 is a reflective LCOS (liquid crystal on silicon) SLM with M rows of sub-holograms, one for each of the input/output port arrays $S_1$—that is one for each of the stacked wavelength selective switches associated with a respective input/output port array. Thus FIG. 2a shows a set of 3 stacked WSSs in which the bottom row of the SLM displays sub-holograms for $S_1$ and in which the top row of the SLM displays sub-holograms for $S_3$. FIG. 2d illustrates the SLM plane, showing dispersion of light from each of the input ports in the x-direction, and switching for each I/O array implemented by separate rows in the y-direction. Each circular region 112 illustrates a demultiplexed beam from one of the I/O arrays, which illuminates a corresponding region on SLM 108 displaying a sub-hologram to deflect the beam to a selected output port. As illustrated in FIG. 2d regions 112 are spatially separated from one another, to reduce beam overlap and are shown as having sharp edges merely for the purposes of the illustration (in practice the beam intensity will diminish somewhat gradually away from the centre of the beam). FIG. 2d also illustrates, schematically, sub-holograms 114 displayed on the SLM. In embodiments these sub-holograms may tile the SLM with substantially no gaps in between. In embodiments, (unlike the illustration) the sub-holograms may be substantially square in terms of numbers of pixels in the x- and y-directions and/or physical dimensions. More particularly, whether or not a sub-hologram region is square, in embodiments a beam impinging upon a sub-hologram has an intensity profile cross section with square symmetry.

As illustrated the demultiplexed beams 112 are shown as circular but, as the skilled person will appreciate, such a beam is modulated with data, the modulation expanding the range of wavelengths occupied by the beam. Thus a modulated beam will, in practice, be elongated in the x-direction (that is along the axis of dispersion), as schematically illustrated by profile 112'. As illustrated in FIG. 2d each demultiplexed optical channel has substantially the same bandwidth. However because the arrangement of the sub-holograms displayed on the SLM 108 is not physically constrained but is merely defined by the displayed phase data the switch may adapt to different bandwidths of the demultiplexed optical beams. This may be done by using a suitable width (in the x-direction) for a sub-hologram deflecting the beam, that is a width which matches the bandwidth of the beam. In one approach, for example, two or more regions allocated to adjacent sub-holograms in a row may be combined to display a single sub-hologram where one beam has ×2 (or ×3 or more) of the bandwidth of another beam. Thus each wavelength from each I/O array has its own respective sub-hologram displayed on SLM 108.

Figure 2E:
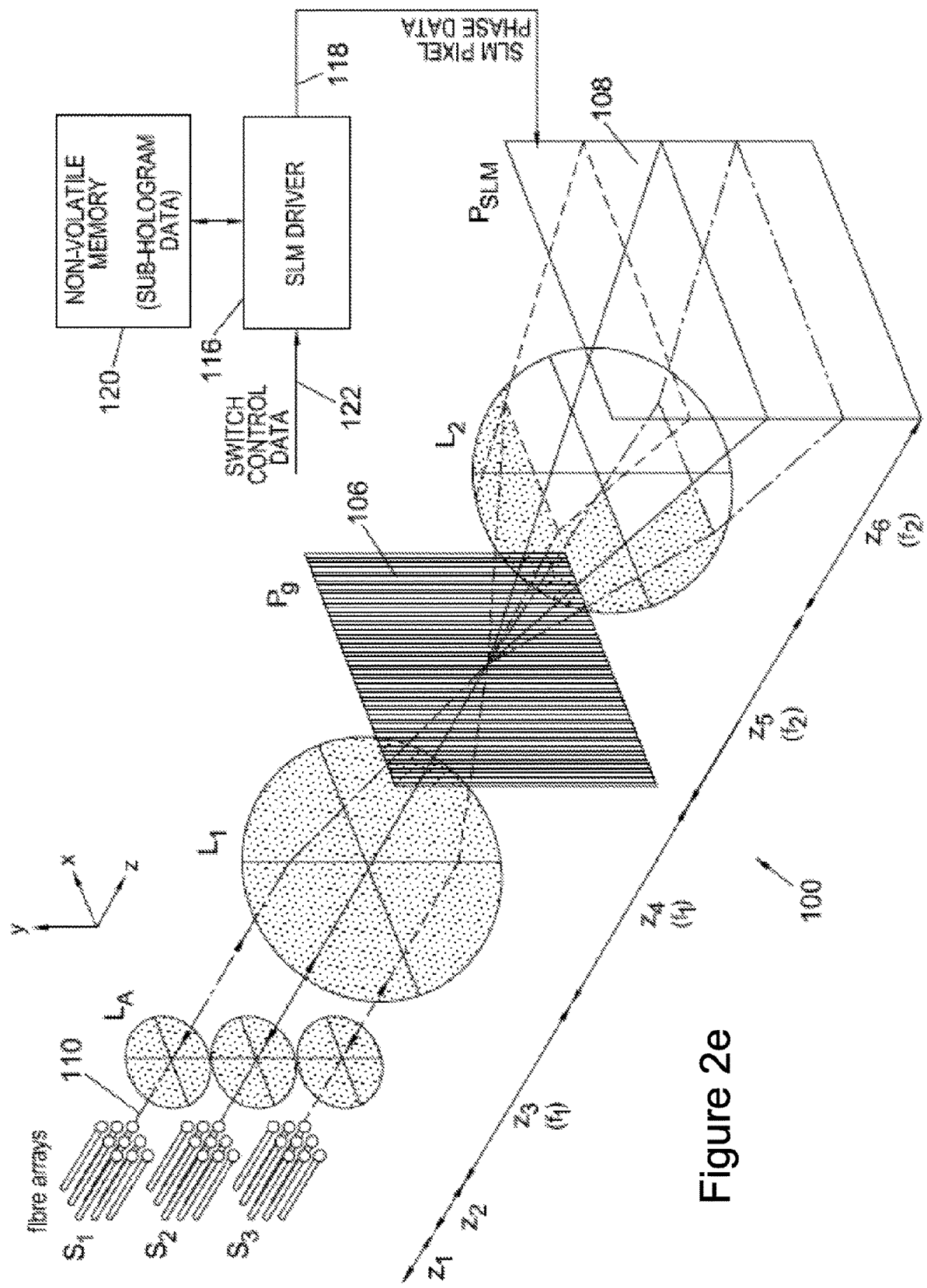
FIG. 2e shows a perspective view of the switch of FIGS. 2a and 2b, showing an array of stacked 1×N wavelength selective switches (WSSs)

Referring to FIG. 2e, SLM 108 may be driven by an SLM driver 116 which provides SLM data on line 118 for display, typically data defining phase levels of the pixels for displaying a plurality of kinoforms on the sub-hologram. In embodiments a sub-hologram for a wavelength may comprise a phase grating, preferably a blazed grating, in a manner well known to those skilled in the art.

Such holograms may, for example, be pre-calculated and stored in non-volatile memory 120 coupled to driver 116. Thus when the driver receives a control signal for the switch on line 122, to direct an input of array $S_i$ at a specific wavelength to a selected output, the appropriate stored sub-hologram may be selected from memory 120 for display at the position along a row corresponding to the selected wavelength. Alternatively grating data may be calculated as needed, for example using (inverse) Fourier transform hardware to calculate the grating from an inverse Fourier transform of the target diffracted spot (output beam location).

Example Sub-Hologram Phase Pattern Calculation

Many techniques may be employed to calculate a suitable sub-hologram phase pattern given a target desired output field. One example procedure is the Gerchberg-Saxton algorithm, which is illustrated by the following pseudo-Matlab code:

```
gin = Amplitude distribution of input field (Gaussian profile assumed)
grossout = Desired output field (the target function). For example, if we
have GN addressable output points
grossout = zeros(GN);
grossout(position 1) = 1;
grossout(position 2) = 1;
Sets two points to have equal amplitude and the other points
zero amplitude
gprime = Kinoform phase pattern
for ite=1:200
    if ite==1
        % start with result of geometrical ray-tracing (initial starting
point – FFT of input field)
        ftg=fftshift(fft(fftshift(gin)));
    else
        % All other iterations use this (FFT of input field×exp(i*phase
of hologram))
        ftg=fftshift(fft(fftshift(gin.*exp(i.*gprime))));
    end
    % Calculate the phase of ftg (dump amplitude information)
    angle_ftg=angle(ftg);
    % Then to get the hologram phase we take the IFFT of the target
function multiplied by
        exp(i*the phase of angle_ftg)
        gprime=angle(fftshift(ifft(fftshift(grossout.*exp(i.*angle_ftg)))));
end
```

As previously mentioned, it may be desirable to incorporate focussing power within a sub-hologram, for example to reduce cross-talk. In embodiments such an approach may comprise deliberately introducing a distorting optical element and then correcting an output beam (of a desired diffraction order) to compensate for the distortion. This may leave other diffraction orders/beams uncompensated so that they remain unfocussed, again to mitigate crosstalk, in particular as described in our earlier published application WO2012/123715 (incorporated by reference). A suitable distorting element is, for example, an axicon, which introduces a ring focus.

If it is desired to introduce focussing (or defocussing) into a displayed hologram this can be achieved straightforwardly by employing a fractional Fourier transform in the above-outlined algorithm: as the skilled person will recognise, a fractional Fourier transform has an order a and reduces to a standard Fourier transform when a=1, but when a is different to unity a quadratic phase factor is added to the Fourier transform, which is the same type of factor that a lens imparts on an optical field. More generally one can calculate a suitable phase hologram pattern based on the transfer function of the optical system.

In a variant of the above-described approach an input beam may be multi-cast to multiple selected outputs simultaneously. In one approach this can be achieved simply by adding the holograms (that is adding the respective phases at each pixel location) for each selected output and displaying the combined result.

Continuing to refer to FIG. 2, the light diffracted from the SLM 108 is in a sense re-multiplexed (although different wavelengths are directed to different outputs) and imaged at plane $P_O$ by the relay optics $L_2$, $L_1$, and by the grating 106 at $P_g$. In the example of FIG. 2a if, say, $F_1=F_2$ then the wavefront leaving the SLM will (in an ideal system) be replicated at $P_O$. Referring to FIG. 2d, a demultiplexed beam may be steered in the x-direction (that is parallel to the axis of dispersion) and in the y-direction. The diffraction grating 106 effectively re-multiplexes the beams, and any angular displacement imposed on a beam by a sub-hologram displayed on the SLM is converted into a positional displacement at the lenslet array $L_A$. The angularly steered beams (now with a positional displacement) are focussed by corresponding lenslets in $L_A$ into a selected output port 104. Beam steering may be achieved by adjusting the period of the displayed blazed grating of a sub-hologram. In principle the lenslet array $L_A$ could be omitted but is included for coupling efficiency and system compactness.

In broad terms embodiments of the system has an input/output plane at a front focal plane of the relay optics ($L_1$, $P_g$, $L_2$) and an SLM at the back focal plane of the relay optics. However the system is configured to demultiplex WDM beams and, in effect, to spatially multiplex a group of wavelength selective switches in a direction (the y-direction) perpendicular to the direction of wavelength dispersion in the system. Thus because each I/O port array, for example each 3×3 fibre cluster, is located at a different lateral position in the y-direction, on passing through the relay lenses $L_1$ and $L_2$ and the demultiplexing grating 106 the input signals from the M (1×8) WSS input ports are dispersed in the x-direction. Moreover the input signals from the M (1×8) WSS input ports and will also be imaged at different lateral positions in the y-direction, and as a result independent rows of sub-holograms can be used to control the signal routing for each of the M switches. As shown in FIG. 2, in embodiments the light is inverted by the 4f relay optics. (Although lenses are preferable as they provide more degrees of freedom to optimize the imaging performance of the relay system, the relay may also be implemented using mirrors).

Thus embodiments of the switch implement M individual wavelength selective switches (in the illustrated example, 1×8 switches) using a common relay system ($L_1$, $L_2$), a common demultiplexing grating 106 ($P_g$), an SLM 108, an array of M objective lenses ($L_A$), and a set of M (for example 3×3) input/output ports or fibre arrays spaced along the y-axis of the system.

We have described the switch 100 as a switch which, for each WSS, routes an input port to one (or more) selected output(s). However the skilled person will appreciate that the optical paths shown in FIG. 2 are reversible, and thus essentially the same system may be used as a stacked set of N×1, in the illustrated embodiment 8×1, wavelength selective switches. For example a 1×8 WSS may route $\lambda_1$ and $\lambda_2$ from the central input port to output ports 2 and 4 respectively. However if one reverses the propagation of light through the system so that there are (in this example) 8 input ports and one centrally located output port, both $\lambda_1$ from port 2 and $\lambda_2$ from port 4 will be routed to the same central output port without having to change the sub-hologram phase patterns $\lambda_1$ and $\lambda_2$. Thus as long as there is no signal contention (two wavelengths of the same value entering the same WSS of the switch via different input ports), one can implement a set of N×1 wavelength selective switches.

Extending this concept, two WDM reconfigurable optical switches, each as shown in FIG. 2, may be combined back-to-back to provide an N×N wavelength selective switch. In particular this may be achieved by connecting each output of each WSS array from the first switch to an input of each WSS of the second switch. That is, for example, a first WSS of the first switch has outputs which are connected to an input of each of the WSSs of the second switch (output one to WSS 1 of the second switch, output 2 to WSS 2 of the second switch and so forth); and each of the WSSs of the first switch is connected in this way. The optical connections may be made in any convenient manner.

Figure 3:
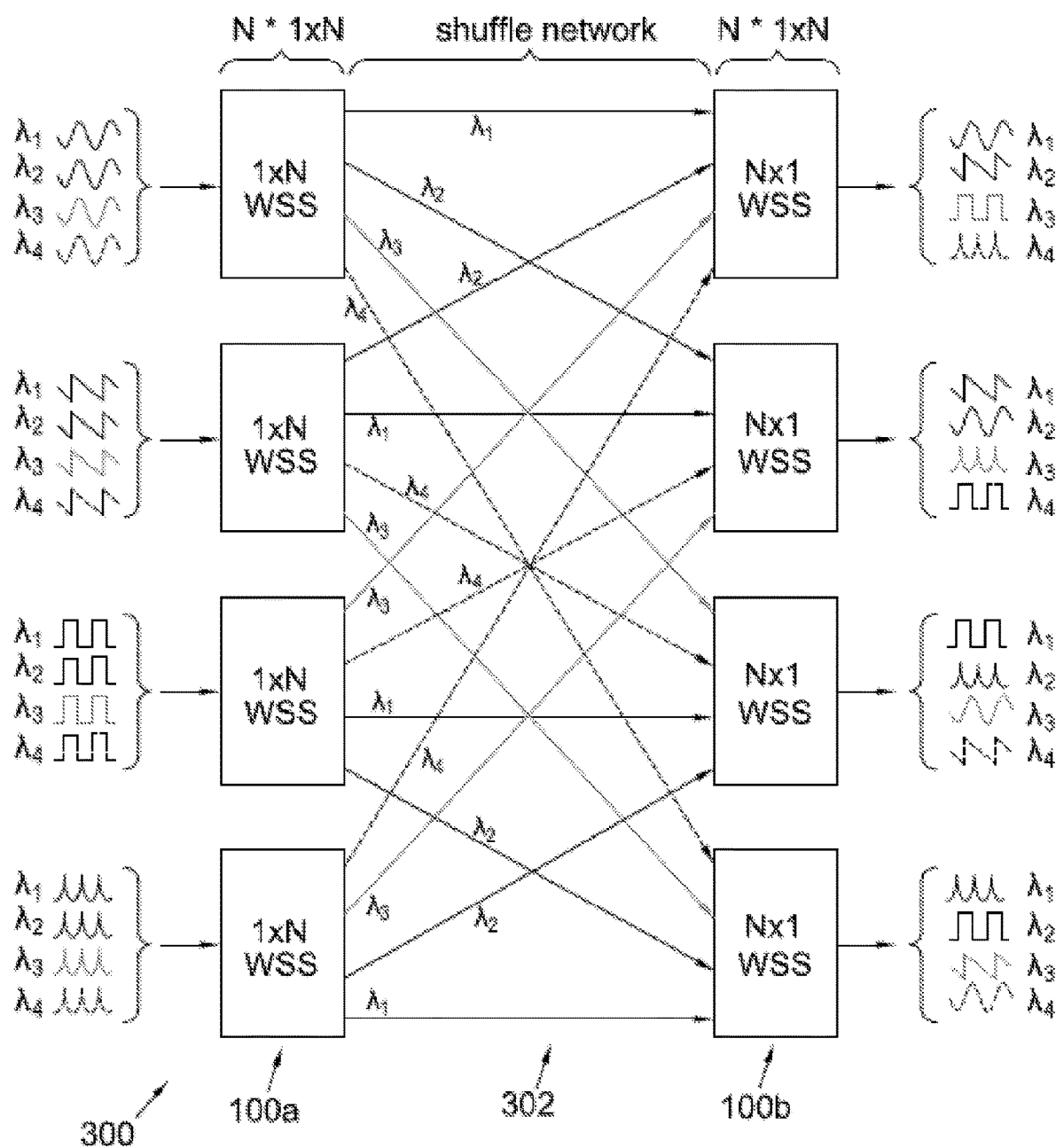
FIG. 3 shows a WDM reconfigurable optical router comprising a pair of connected switches each of the type shown in FIGS. 1 and 2, illustrating an example interconnection pattern for a N×N WSS comprising an array of input and output 1×N WSSs and a static shuffle network where example N=4, wherein the switch can be reconfigured to route any wavelength from any input port to any output port, and is contentionless.

Thus referring to FIG. 3, this shows an embodiment of an N×N wavelength selective switch or optical router 300 comprising first and second WDM reconfigurable optical switches 100a, 100b, each as previously described, connected back-to-back by a set of optical connections 302, to implement a non-blocking WSS router. The set of connections 302 may be referred to as a shuffle network ($N^2 \times N^2$), more particularly a static shuffle network, and may be implemented, for example by one or more of: a fibre shuffle network connected to the 1×N output ports and N×1 input ports; free space optics; or a planar lightwave circuit, which may include additional functionality, for example channel monitoring for active alignment. For example in embodiments a commercially available fibre shuffle network may be employed comprising individual single mode fibres laminated to a flexible substrate for mechanical rigidity, typically with the inputs and outputs are separately connectorized.

The example of FIG. 3 shows wavelength selective switches where N=4 (and uses a 16×16 shuffle network), and where the respective wavelengths are labelled $\lambda_1$ to $\lambda_4$: as can be seen the router can be reconfigured to route any wavelength from any input port to any output port. Embodiments of such a system are therefore contentionless.

In the example of FIG. 3 only four wavelengths are shown for simplicity but in practice one would use an N×N WSS with N input ports and N output ports in which each port may support C wavelength channels, where in principle C may be any number greater than 2. For example, in the case of the 4×4 WSS shown in FIG. 3, each individual input and output port might carry up to 80 signals with 50 GHz channel separation across the C-band—that is C=80. The skilled person will also appreciate that, as previously mentioned, in embodiments channels may be of variable width (wavelength range) so that, for example, a pair of adjacent channels might be combined. In such an arrangement C is variable.

The skilled person will appreciate that a routing system of the type illustrated in FIG. 3 may potentially be implemented with multiple front end switches and multiple back end switches—for example with a switch arrangement where N=4 two front-end and two back-end switches may be employed to provide an 8×8 non-blocking WDM optical router.

WSS Examples

We will now describe in more detail liquid crystal on silicon (LCOS) based wavelength selective switches (WSSs), more particularly the design of a stacked 1×N WSS module. Here, for example, a 1×N WSS has one input port and N output ports and an N×1 WSS has N input ports and one output port, and is a 1×N WSS used in reverse. An LCOS SLM is used by way of example—the designs can also be implemented using a transmissive SLM.

Basic Operation of a 1×N WSS

Figure 4A:
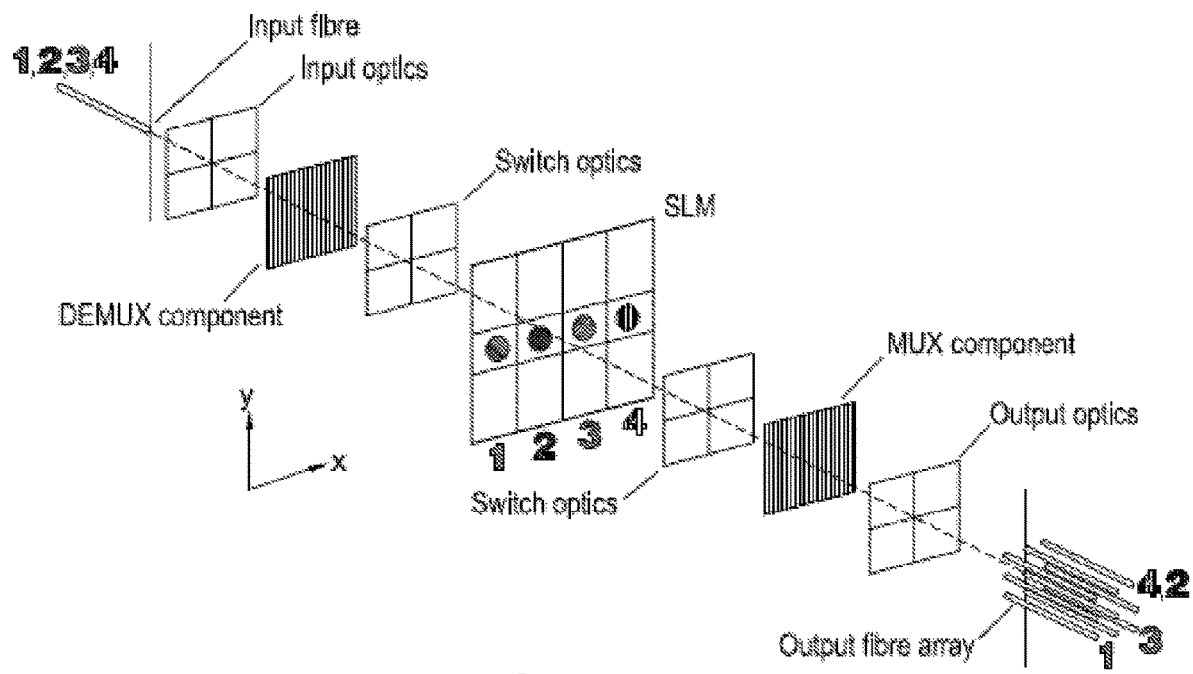
FIGS. 4a to 4c show, respectively, a functional outline of a 1×N switch based on the use of square sub-holograms at the LCOS SLM plane illustrating four signal channels being routed to four output fibres; a functional outline of a 1×N switch with elongated beams at the LCOS SLM plane illustrating four signal channels being routed to four output fibres; and an outline of an example N×M wavelength selective switch based on two LCOS switch planes where N=M=4 and each input port carries four wavelength channels.

FIG. 4a illustrates the functional optical layout of a generic 1×N WSSs, dispersing WDM wavelength channels across a LCOS phase modulating device, and using gratings to steer the signal beams to specific output fibres.

The switch comprises:
1) An input fibre.
2) Input optics, which may include polarization diversity components, and components to transform the Gaussian beam radius of the input beams to one matching the LCOS SLM sub-holograms.
3) A DEMUX component.
4) Switch optics that directs the de-multiplexed beams onto the LCOS SLM.
5) A LCOS SLM displaying an array of sub-holograms.
6) Switch optics that directs the steered beams to a MUX component.
7) A MUX component to angularly recombine the data channels.
8) Output optics, which may include polarization diversity components, and components to transform the data channels to optical modes that match the output fibre mode characteristics.
9) An output array of N output fibres.

It should be noted that, in practice, the LCOS SLM operates in reflection due to the fact that a silicon chip is used to implement the array of individually addressable electrodes that make spatial phase modulation possible. As a result, the switch is typically folded back on itself. Thus the input fibre and output fibre array are in embodiments fabricated as a single component. Similarly, in embodiments a single grating operates as both the DEMUX and MUX component, as does the input and output switch optics. This is also true for the input and output optics.

In operation:
1) Data enters the switch via a single input fibre (denoted 1, 2, 3, and 4 in this example).
1) A DEMUX component, which is typically a diffraction grating, angularly separates the data channels.
2) The switch input optics converts the light associated with each data channel into a series spatially separated Gaussian beams at the LCOS SLM plane. A corresponding series of independent sub-holograms then angularly steer the beam in two dimensions. This may be achieved by displaying quantized blazed phase gratings.

3) The steering angle is a function of both grating period and pixel size. However, in the case of a blazed grating we aim to keep the minimum number of pixels per period, $p_{min}$, greater than eight pixels in order to maximize diffraction efficiency.
4) The switch output optics directs the diffracted beams to the MUX grating whilst maintaining an angle of deflection in the xy-plane as imparted by the blazed gratings.
5) The MUX component angularly re-multiplexes the signal beams so that they effectively align whilst maintaining the angle of deflection in the xy-plane as imparted by the blazed gratings.
6) The output optics then converts these deflection angles to spatial offsets in the xy-plane. In addition, the output optics ensure that the data channels couple efficiently into the correct output fibre.

The same optical configuration shown in FIG. 4a can also be used as an N×1 WSS. To explain this, we consider the reversibility of optics. For example, as a 1×N WSS we may route $\lambda_1$ and $\lambda_2$ from the central input port to output ports 2 and 4 respectively. If we reverse the propagation of light through system so that we have eight input ports and one centrally located output port, both $\lambda_1$ from port 2 and $\lambda_2$ from port 4 will be routed to the same central output port without having to change the sub-hologram phase patterns. Thus, as long as there is no signal contention (two wavelengths of the same value entering the switch via different input ports), we can implement an N×1 WSS.

1×N WSS Based on Elongated Beams

Figure 4B:
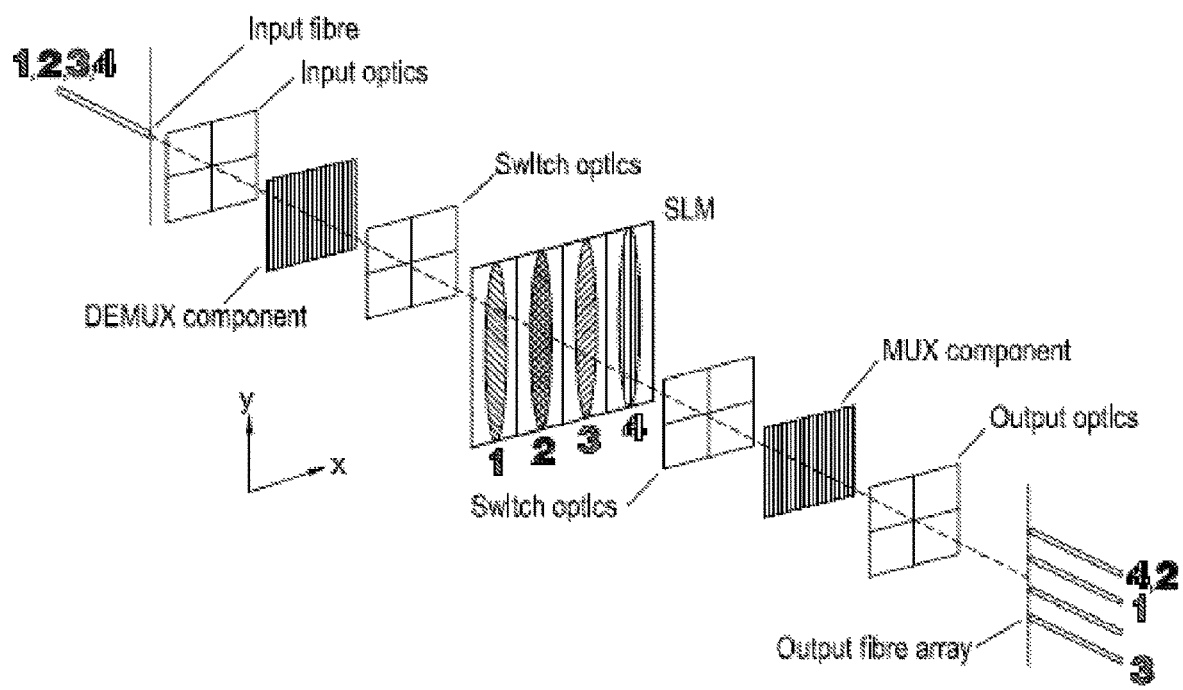

An LCOS based 1×N WSS may be constructed using anamorphic (cylindrical) switch optics to convert the input signals to elongated beams at the LCOS plane, as illustrated in FIG. 4b. In this example the output ports extend along an axis perpendicular to a direction of dispersion. This addresses the following constraints: The limited number of pixels that the current generation of HD and 2K LCOS SLM technology supports; the fact that the most effective DEMUX components are high spatial frequency gratings that disperse the light linearly (i.e., light is dispersed linearly to the x-axis); and passband-related issues: If one changes the wavelength of an unmodulated signal beam from its ideal ITU (International Telecommunications Union) grid value, the insertion loss as it transmits through the WSS will increase as the beam moves away from the centre of the sub-hologram due to clipping and subsequent diffraction effects. In practice due to the finite spectral bandwidth of a modulated data signal, and potential jitter and drift of the central carrier frequency of a specific wavelength channel, this will lead to signal errors. As a result, it is preferable to ensure that the switch design has a sufficient passband, defined as the change in central carrier frequency from its ideal ITU value that results in an increase in insertion loss of 0.5 dB, to minimally affect the data being transmitted through the switch. This sets a minimum ratio of unmodulated signal beam radius to sub-hologram width in the direction of wavelength dispersion.

For example, a 2K LCOS device is comprised of approximately 2K×1K pixels. If this has to support 80 50 GHz ITU channels, one would only be able to allocate approximately 2000/80=25 pixels per sub-hologram in the y-direction, assuming this is the direction of linear dispersion of the DEMUX element. Let us assume that there is a circular Gaussian beam of radius $w_{SLM}$ incident on a square sub-hologram of dimensions $n_x \times n_y$ pixels, where the pixel size is $\Delta \times \Delta$. Such a sub-hologram can steer in both the x and y-directions equally well, with a maximum radial deflection in the xy-plane dependent on the minimum number of pixels per grating period, $p_{min}$, we allow. As mentioned, in practice we set this value as >8 pixels in order to maximize sub-hologram diffraction efficiency.

It can be shown that the number of discretely addressable fibres that can be steered to in a direction parallel the y-axis is given by:

$$q_{max} = 2 \times \text{floor}\left(\frac{\pi}{\alpha_{SLM} \alpha_i} \frac{n_y}{p_{min}}\right) \qquad (1)$$

In addition to the terms defined above:
With respect to the switch passband we define a term $a_{SLM}=n_y\Delta/w_{SLM}$. This gives the ratio of the unmodulated Gaussian beam radius at a sub-hologram to the sub-hologram width. This is a key parameter in determining how cleanly transmitting data will be transmitted through the WSS, and through cascaded WSSs. To meet the passband requirements for 50 GHz channel separation, we should set $a_{SLM} \geq 5$. Thus there is a trade-off between passband and steering range.
The term $a_i$ defines the ratio of the spacing between fibres at the output plane, Y, and the Gaussian beam spot size at the output plane, $w_i$. The larger the $a_i$ the more widely separated the output beams. Typically we set $Y/w_i \geq 3$ to minimize crosstalk.

As a result, a circularly symmetric Gaussian beam incident may cover at most 15 pixels at the LCOS SLM plane in both the x and y directions if we are dealing with a 2K LCOS SLM and 80×50 GHz signal channels. Setting $p_{min}=4$, $a_{SLM}=5$, $a_i=3$, and $n_y=25$ results in a value for $q_{max}$ of 2. Thus steering in two dimensions would give a switch capacity of 8 ports assuming the fibres are arranged on a uniform grid. However, due to the low value of $p_{min}$, the switch would have a high insertion loss and crosstalk. Increasing $n_y$ to 50 allows us to double the value of $p_{min}$, and improve performance.

By elongating the sub-holograms along the y-axis, we can increase the number of spatially distinct locations that a sub-hologram can steer to in that axis. For example, if $p_{min}=8$, $a_{SLM}=3$ (in the y-direction), $a_i=3$, and $n_y=500$, then $q_{max}>40$ (one can reduce $a_{SLM}$ in the y-direction as it has no role in defining the passband). Note that we still keep $a_{SLM}=5$ in the x-direction (the direction parallel to the axis of wavelength dispersion) to meet the passband requirements. One can use anamorphic (cylindrical) switch optics that simultaneously image the input fibre beam in the x-axis, and create an elongated beam along the y-axis with a Fourier-transform condition between the SLM plane and the output plane along the same axis. As a result, we can steer to a sufficiently large number of output ports in the y-direction for ROADM applications. However, a drawback of this approach is that we are unable to steer the beam in the x-direction.

It should be noted that here we make a distinction here between number of fibres that can be steered to, $q_{max}$, and the positional resolution of beam steering, defined as the minimum angular or spatial deflection of an output beam with respect to an output port. For example, we may be able to steer to 40 spatially separate fibres having a mode field radius of 5.2 µm, but with a spatial positional steering resolution of down to 0.2 µm.

N×M WSS Based on Two Switching Planes

Figure 4C:
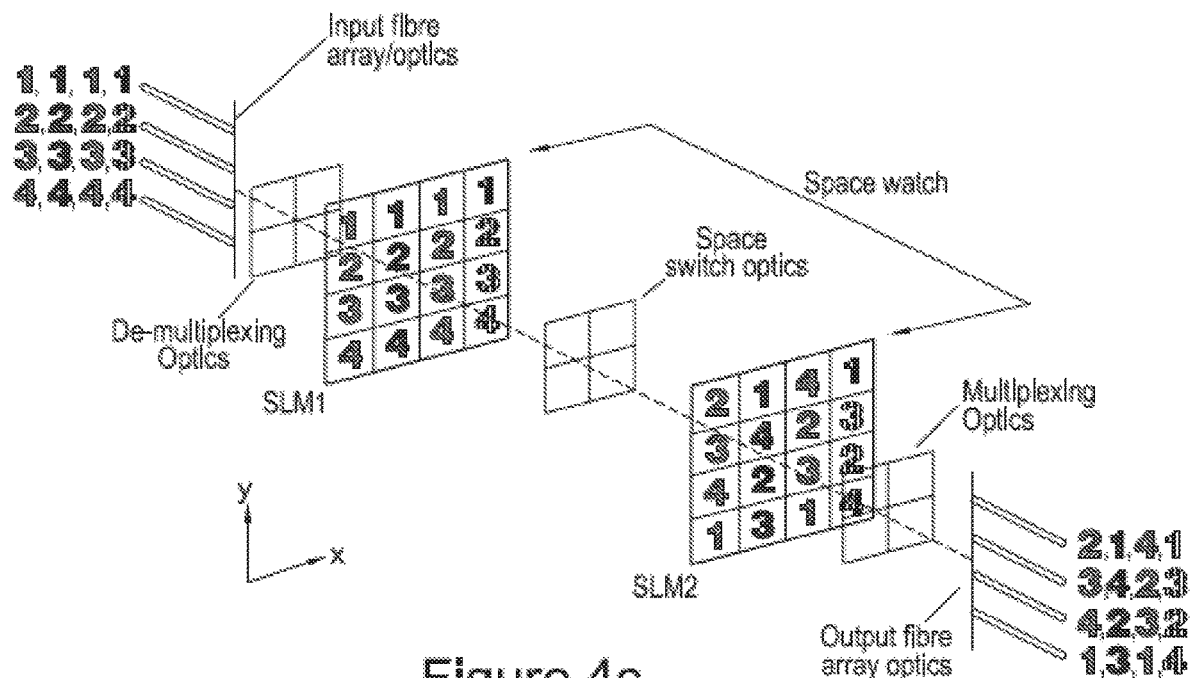

FIG. 4c illustrates the generic optical architecture of an N×M WSS based on two separate LCOS switch planes. In practice these two switch planes can be implemented on the same LCOS SLM. In the example system illustrated in FIG. 3, M=N=4. The switch comprises:

N input fibres.

Input optics, which may include polarization diversity components, and components to transform the Gaussian beam radius of the input beams.

A DEMUX component to angularly separate the data channels.

A first LCOS SLM plane.

A second LCOS switch plane.

Intermediate optics between the two switch planes.

A MUX component to angularly recombine the data channels.

Output optics.

M output fibres.

The switch operates as follows:
1) Optical data channels enter the switch via the N input fibres (denoted 1, 2, 3, and 4 in this example).
2) Each of the input beams are angularly de-multiplexed in the y-direction.
3) As a result, each wavelength channel from each input port illuminates a separate sub-hologram, with rows corresponding to a specific input fibre, and columns corresponding to a specific wavelength channel.
4) The first LCOS SLM displays gratings that angularly steer the beams in the yz-plane.
5) These beams are re-ordered in the y-direction when they are incident on the second LCOS plane.
6) A second set of blazed grating on the second LCOS plane then diffracts the beams such that when the MUX element recombines the wavelengths from a specific row, all wavelength channels propagate collinearly.
7) Output optics then focus the signal beams into one of the available M output fibres.

Although each sub-hologram can steer light in two-dimensions, to prevent signal contention in a WSS, light is only steered in the yz-plane between the two LCOS SLM planes. Such a system may be improved by considering the elongated beams at the sub-holograms, to maximize the values of N and M.

Flex-Spectrum Data Format

Currently the telecom network operates using a series of wavelength channels with pre-assigned operating frequencies, known as the ITU grid. Typical channel spacing's are 100 GHz, 50 GHz, 37.5 HGz, or 25 GHz. Flex-spectrum, also referred to as Flex-grid, is a newer standard that allows for more flexible channel allocation, allowing a higher efficiency in the use of the available spectral bandwidth. In this specification when we refer to square sub-holograms, we generally (but not exclusively) refer to an unmodulated signal that has a circular Gaussian beam profile at the sub-hologram plane. As the data rate increases, the spectral content of a channel will also increase. As a result, the width of a sub-hologram will expand in the x-direction to accommodate the wavelength channel.

Design of a Stacked 1×N WSS Module Using Square Sub-Holograms

Figure 5A:
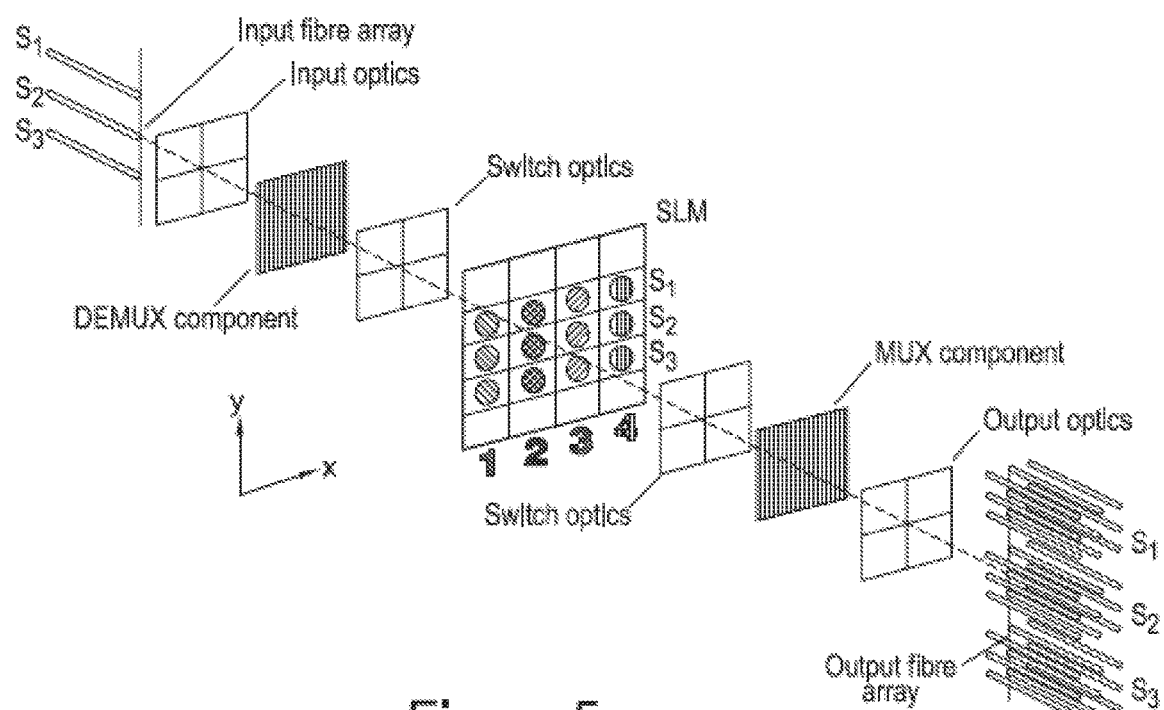
FIGS. 5a and 5b show, respectively, a generic optical system where a number of 1×N WSSs are stacked using a common LCOS SLM; and an example of a 1×N WSS based on square sub-holograms with N=8.

We now describe a WSS based on a stacked array of 1×N WSSs and in embodiments, but not essentially, square sub-holograms. Referring to FIG. 5a, this shows a 1×S array of input fibres (denoted $S_1$, $S_2$, and $S_3$ in this example), each carrying a set of WDM wavelength channels launch light into the switch. The input from each fibre is dealt with separately, and the wavelength channels from a specific input port are spatially de-multiplexed across a unique row of sub-holograms. The wavelength channels are then independently routed to a corresponding two dimensional fibre array comprised of S sub-arrays. The switch optics are designed to produce circular unmodulated signal beams at the LCOS SLM plane rather than elongated beams using anamorphic optics. These can be steered in both the x and y-directions simultaneously, rather than just in the direction perpendicular to the axis of dispersion. It is preferable (but not essential) to use an LCOS SLM with a larger pixel count to that described previously, say of order 4K×2K pixels. This increases the number of available pixels in the wavelength dispersion axis, albeit in this example only from 25 to 50 pixels (assuming 50 GHz channel spacing). Nonetheless, embodiments of the WSS approach we describe here have the potential of handling, in the case of a 4K LCOS SLM, up to forty separate 1×N WSSs, assuming square sub-hologram dimensions of 50×50 pixels for a 50 GHz frequency slot. In addition, in preferred embodiments the output fibre array is arranged as a two-dimensional structure where one can either use an S×N array of separate fibres at the output plane, or S multi-core fibres, each containing N separate fibre cores, as described later.

Design of a Single 1×N WSS Based on Square Sub-Holograms

Figure 5B:
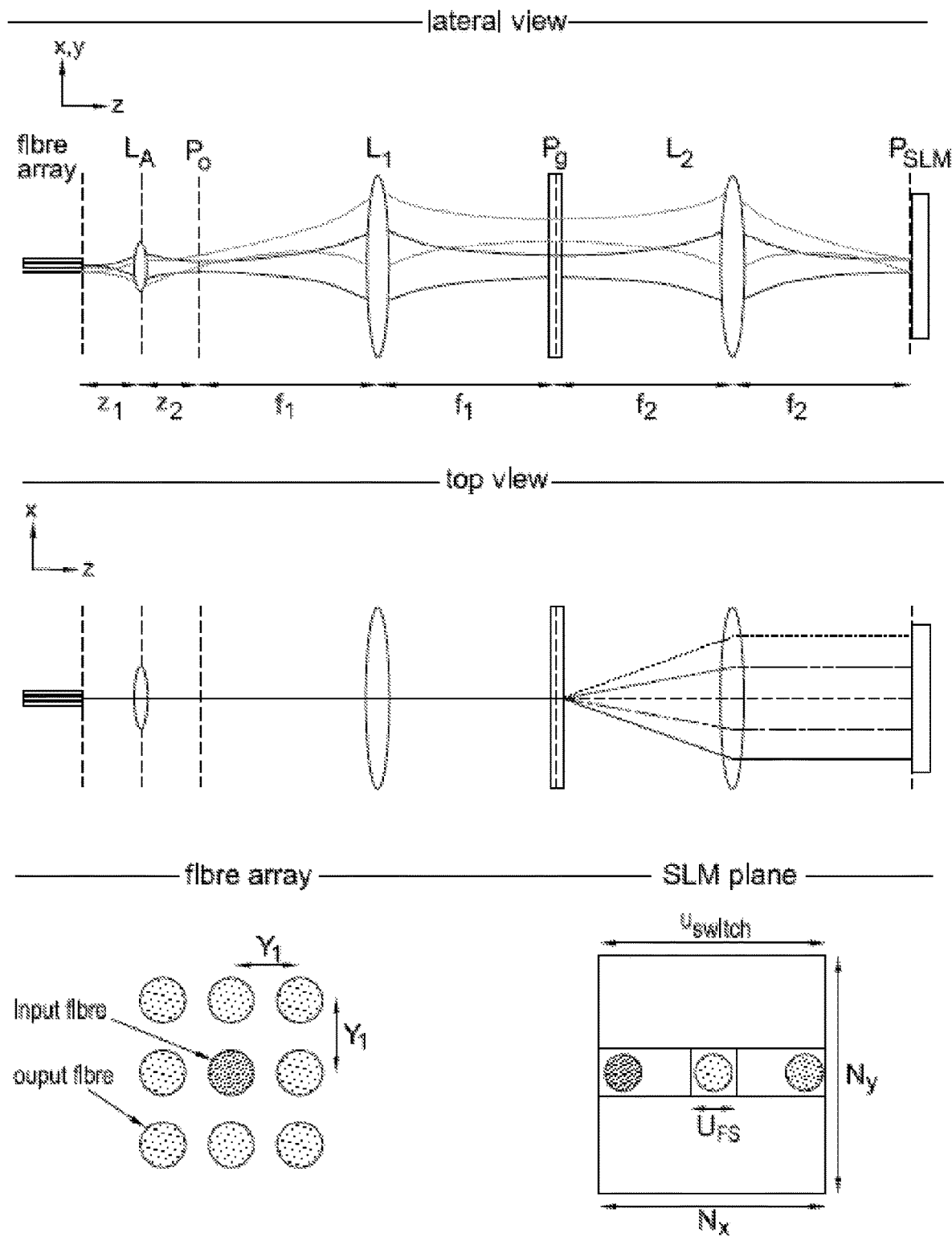
Figure 6:
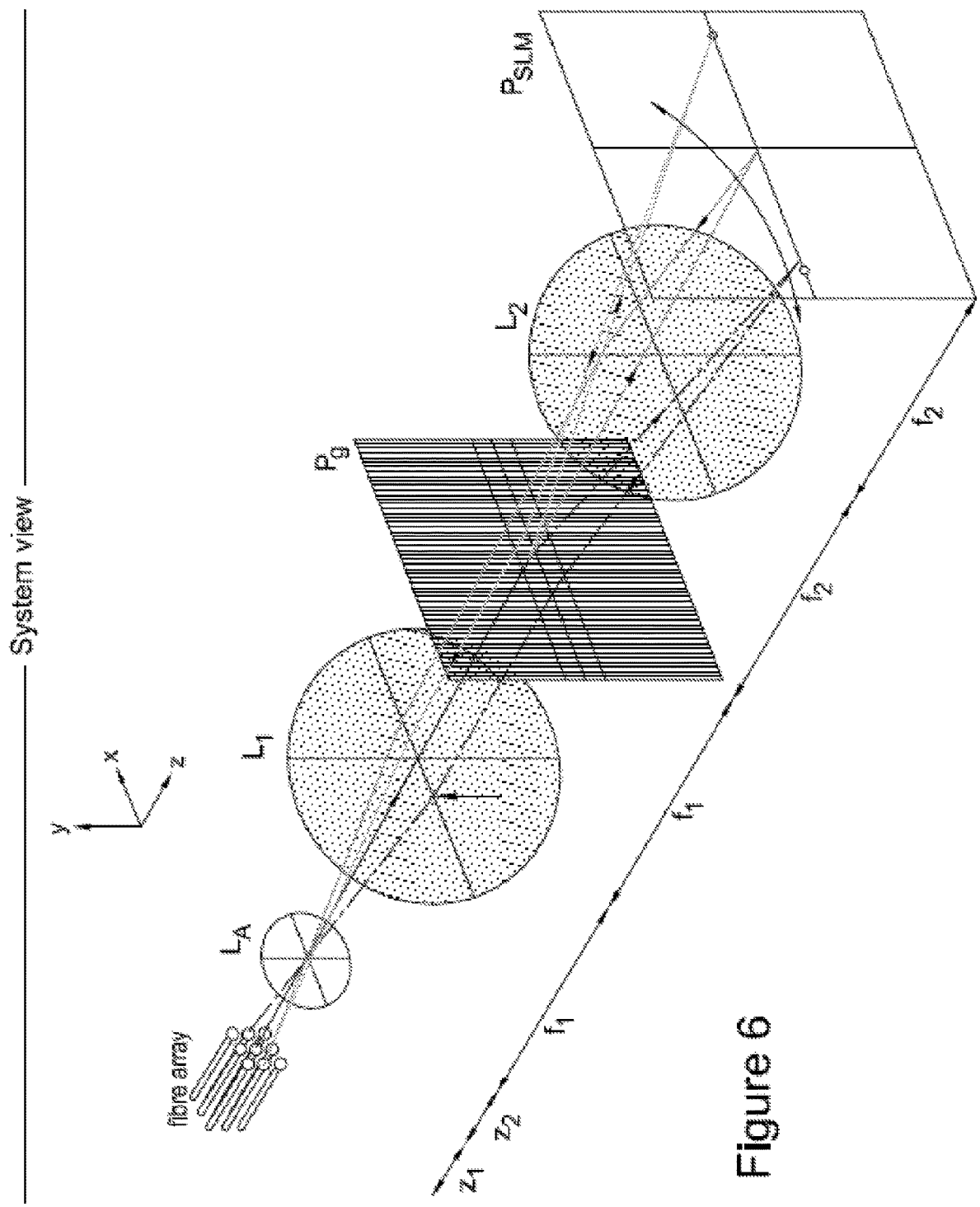
FIG. 6 shows an example of a 1×N WSS based on square sub-holograms with N=8.

Before describing the design of a stack of S 1×N WSSs, we first describe the design of a single 1×N WSS switching unit. In FIG. 5b and FIG. 6 (which shows an example functional architecture of the switch) we illustrate a 1×N optical switch based on square sub-holograms using a reflective LCOS SLM, where the C-band is dispersed across the x-axis of the LCOS SLM. For illustration we set N=8, which uses a 3×3 array of fibres. Note that the LCOS SLM may be based on ferroelectric liquid crystal material, blue phase liquid crystal material (see our WO2013/117903, incorporated by reference), or nematic liquid crystal material. In terms of operation: ferroelectric liquid crystal materials are polarization insensitive, but have an associated 3 dB loss for conventional binary phase modulation. Blue phase liquid crystal materials are also polarization insensitive. Nematic liquid crystal materials are intrinsically polarization dependent. With nematic liquid crystal materials one can use polarization diversity optics. This may be achieved using either polarization re-tracing (using the same sub-hologram for both input polarizations) or by using two separate sub-hologram rows for orthogonal polarizations. Alternatively one can use an integrated quarter waveplate to make a nematic liquid crystal LCOS SLM polarization insensitive.

With reference to FIG. 5b, the central fibre corresponds to the input port, and the remaining eight fibres correspond to the output ports. The switch comprises:

A two-dimensional 3×3 fibre array.

An objective lens $L_A$.

A 4f relay system comprising lenses $L_1$ and $L_2$.

A DEMUX grating $P_g$.

A reflective LCOS SLM positioned at plane $P_{SLM}$.

The switch embodiment operates as follows:
1) The wavelength channels are launched into the switch via the central fibre in the fibre array.
2) The objective lens, $L_A$, generates a beam waist of radius $w_o$ at plane $P_o$.
3) The relay system images this waist at the SLM plane.
4) The LCOS SLM displays a grating of period p and orientated at an angle of $\varphi$ with respect to the local xy-coordinate system that diffracts the light beam such that it leaves the LCOS SLM with a propagation vector of $k(p,\varphi)$.
5) This beam is imaged by the relay system at plane $P_o$.

6) The objective lens converts the propagation vector of k(p,φ) to a beam position that is offset from the optical axis.
7) The angle is controlled such that the beam is concentric with respect to the intended output fibre, thereby maximizing coupling efficiency.
8) To route each signal wavelength independently, the DEMUX grating imparts an angular displacement of $B_G(\lambda)$ to each signal beam. The system is preferably optimized to ensure that beams are spatially separate at the LCOS plane if their frequency spacing is $\geq v_{FS}$, where $v_{FS}$ is the minimum local frequency slot width.
9) Each signal beam is routed independently by a sub-hologram at the LCOS plane. All the beams overlap at plane $P_o$, albeit with different propagation vectors, denoted as k(p,φ,λ). As a result each wavelength can be separately routed to one of the N output fibres.

Note, for convenience we have drawn the DEMUX grating perpendicular to the incident optical axis. In reality the grating is preferably orientated at a specific angle for maximum diffraction efficiency, and the light will be dispersed about an optical axis that is not collinear with the incident optical axis. As a result, plane $P_o$ is an image of the LCOS SLM plane, and one can therefore treat the design problem as if the LCOS SLM were placed at $P_o$.

Clustered Output Fibres

It is advantageous to the switch operation to use a single lenslet element before the N output fibres, which we shall refer to as a clustered output (rather than using a coupling lenslet before each fibre).

Due to the limited number of pixels per sub-hologram we have assumed, and the limitations implied by Eq. (1), the output beams will be closely packed at the fibre array plane. For example, if we set $a_i=3.0$ to maximize the number of ports that can be steered to, the beam radius at the output plane equals the mode radius of a single mode fibre. As a consequence, the output port spacing may be very small. This may be mitigated by advances in the resolution of LCOS SLMs but additionally or alternatively this may also be mitigated by one (and in principle more) of the following example techniques:

The use of a magnification stage to increase the beam separation to a point where a secondary lenslet array focuses the signal beams into spatially separated fibres.

Figure 7:
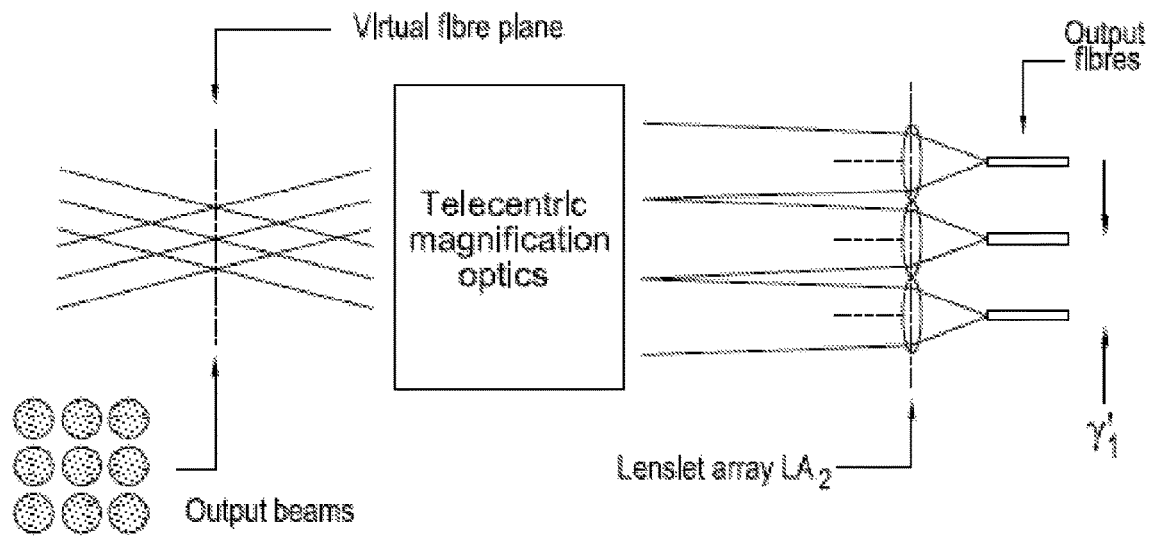
FIG. 7 shows an illustration of secondary magnification stage based on telecentric relay and secondary lenslet array to couple into output fibres.

Operation of the clustered lenslet element in a non-telecentric configuration in conjunction with a secondary lenslet to focus the signal beams into spatially separated fibres FIG. 7 illustrates how one can separate the closely packed output beams using a secondary telecentric magnification stage that has a magnification factor of M. This increases the output beam separation from $Y_f$ to $Y_f'=M \times Y_f$, and the output beam size to $Mw_o$. A secondary lenslet array, $LA_2$, then focuses the beams to match the mode field radius of the output fibres.

Figure 8:
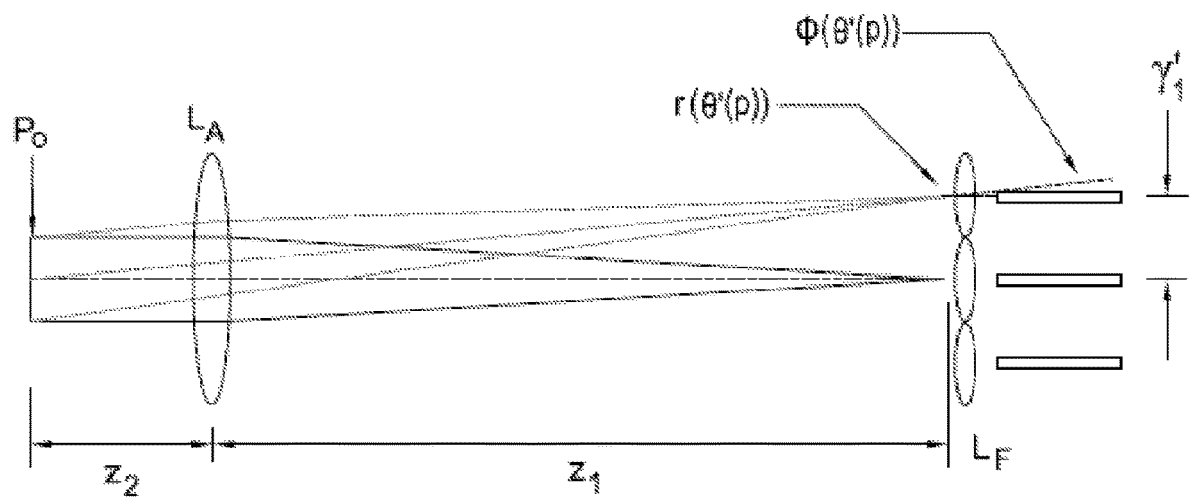
FIG. 8 shows an illustration of non-telecentric relay system.

One can also achieve a similar benefit without the use of a magnification stage by modifying the clustered output approach, as illustrated in FIG. 8. The objective lens no longer operates in a telecentric configuration. Instead, by setting $z_1 \neq f_A$ we cause the output beams to be focused at an angle of φ(θ'(p)) with respect to the optical axis. Here:

The term p is the period of the displayed grating.

$w_o$ is the incident Gaussian beam radius.

θ'(p) is the steering angle of a beam corresponding to a sub-hologram period of p at plane $P_o$ with respect to the optical axis.

r(θ'(p)) is the offset of the central Gaussian beam ray with respect to the optical axis.

φ(θ'(p)) is angle the central Gaussian beam ray makes with respect to the optical axis of the objective lens.

In terms of geometric optics we can set the object distance, $u=z_1$, and the image distance $v=z_2$. Thus the height of a specific beam with respect to the optical axis plane as a function of input deflection angle, r(θ'(p)), and the angle the central ray associated with this beam makes with respect to the optical axis, φ(θ'(p)) can be calculated as:

$$r(\theta'(p)) = \theta'(p)\left[z_1 + z_2 - \frac{z_1 z_2}{f_A}\right] \quad (2)$$

$$\phi(\theta'(p)) = \theta'(p)\left[1 - \frac{z_2}{f_A}\right] \quad (3)$$

As the beams propagate at an angle to the common optical axis of the lenslet, they have a greater physical separation at the output plane. Note that a secondary lenslet array, $L_F$, may be used to couple into the output fibres. To compensate for the angular error in the beam propagation direction, φ(θ'(p)) with respect to a fibre array that is fabricated such that the fibre axes are parallel to the optical axis, one can either, for example:

Arrange the fibres so that they are angled at φ(θ'(p)) to minimize insertion loss.

Use an array of fibres that are normal to the output plane, and offset the secondary lenslet array positions to ensure all signal beams are focused parallel to the optical axis of each fibre.

Add an additional lenslet array positioned immediately before the fibre array that compensates for the angular variation, φ(θ'(p)). The array is designed such that each lenslet either corrects for the arrangement of fibres associated with a single 1×N WSS in the stacked switch structure, or corrects for each fibre individually.

To optimize this design Gaussian beam analysis may be performed to match the beam waist to the output fibres for the output ports.

Two-Dimensional Fibre Arrangements

Being able to steer in two-dimensions in a WSS increases the flexibility in choosing the output fibre geometry. Examples of square packed and hexagonally packed fibre arrangements which may be used with the system are shown in FIGS. 9a and 9b respectively. Here it is assumed that the zeroth order is focused at the centre of the fibre arrangement. An advantage of the hexagonal arrangement is that one can increase N for a given maximum beam deflection angle. For example, for a 4K LCOS one can increase N from 8 to 12 by this rearrangement, assuming a minimum average grating period of 7.5 pixels per period instead of eight pixels per period.

Figure 10:
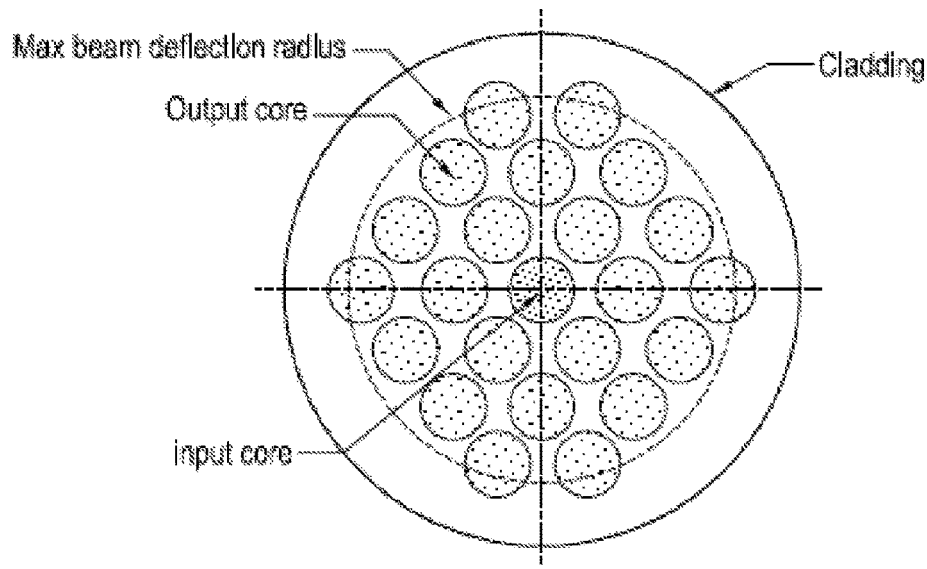
FIG. 10 shows an example of multi-core fibre in which red (dark) fibre denotes an input core and blue (lighter) fibres denote the cores that lie within the maximum beam deflection radius.

The fibre array may be fabricated from individual fibres, or the output fibre array may be implemented using a multi-core fibre containing N cores, as illustrated in FIG. 10. This latter arrangement is particularly suitable in facilitating fibre when one has S stacked 1×N WSSs. Multicore fibres with a target inter-core crosstalk levels of −30 dB after 100 km are being developed.

Referring back to the description above, although embodiments of the switch may be limited in the number of discrete positions to which one can steer to due to restrictions imposed by $p_{min}$ and the limited number of pixels in a sub-hologram, $n_x \times n_y$, embodiments of the switch are nevertheless able to steer any given beam with great accuracy.

For example, a sub-hologram with 60×60 pixels, and 128 phase levels can steer with an accuracy of around 5 arc seconds. As a result, any fabrication errors associated with a multicore fibre may be compensated for by optimizing the sub-hologram phase patterns.

Separation of Input Port from Zeroth Order

Figure 9:
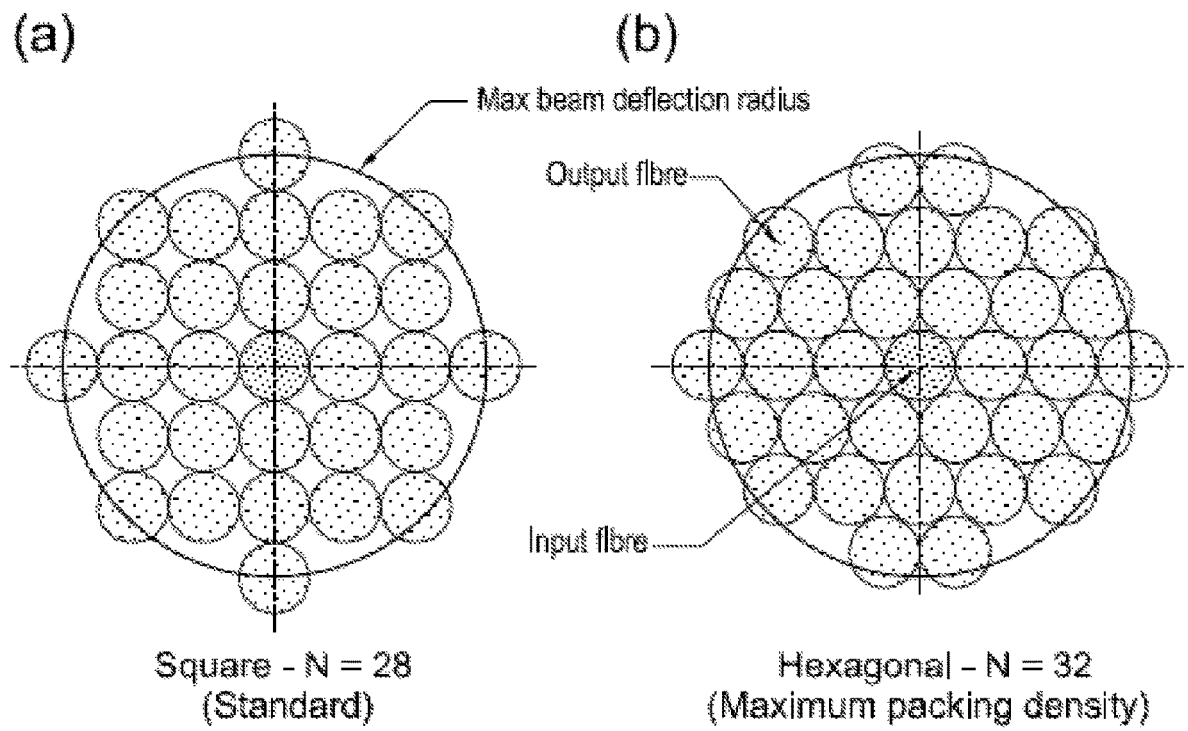
FIG. 9 shows a comparison of output port arrangement schemes illustrating (a) a rectangular grid port arrangement, and (b) a hexagonal port arrangement to maximize N.
Figure 11:
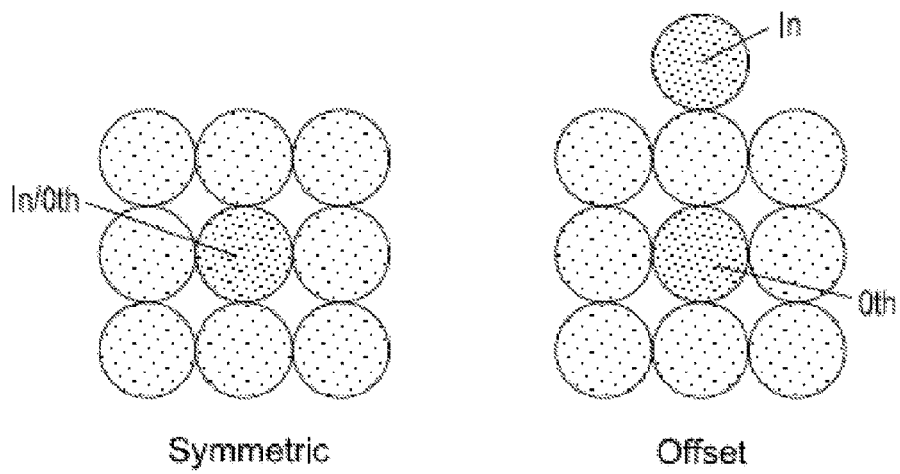
FIG. 11 illustrates separation of the input fibre and zero order output position to reduce switch back-reflections.

A potential disadvantage of the fibre schemes illustrated in FIGS. 9 and 10 is that the input fibre coincides with the location of the zeroth order. In practice, the power in the zeroth order can be suppressed by approximately 20 dB with respect to the signal beam but light may then still be back-reflected from the switch. To mitigate this one may use optical isolation, at increased cost for the switch. Alternatively, one of the "output" fibres may be used as the input, and the optical system tilted such that the zeroth order is directed to the centre of the array, as shown in FIG. 11.

This zero order power may be used as a monitoring port. Alternatively, if the switch failed, it may be used as a protection express port as all channels would then be directed to this point.

Wavefront Encoding Based on Common Filtering at the Objective Lens Input Plane

We have previously described a wavefront encoding technique to suppress crosstalk, in WO2012/123715. A development of this approach may be employed in the switch structure described here.

Figure 12:
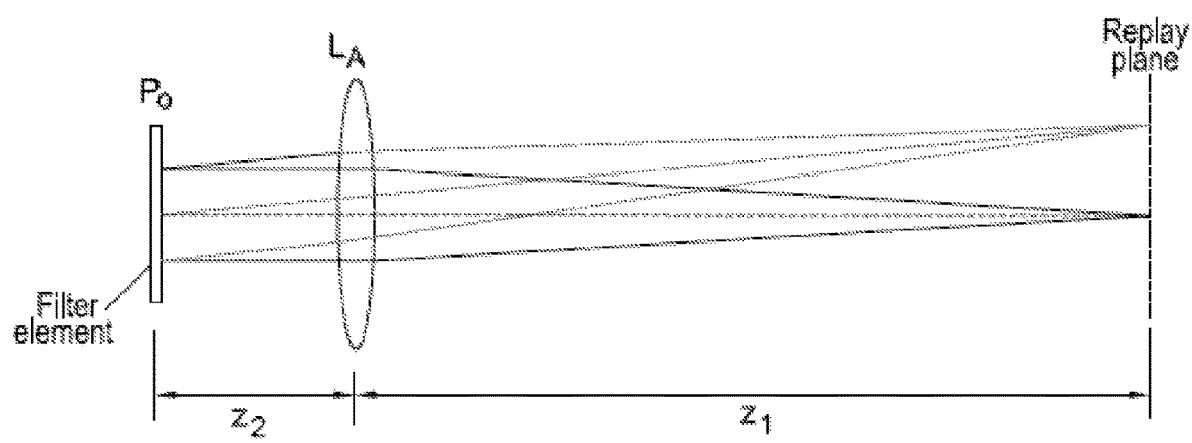
FIG. 12 shows an example of common filtering at objective lenslet input plane, $P_o$.

In particular a wavefront-modifying or "filter" element may be placed at the common input plane to the objective lenslet, that is at plane $P_o$ as shown in FIG. 12 This filter acts as a "lock" that may then be matched by a suitably modified sub-hologram phase pattern. This has the effect of only correcting for the signal beam, and causes the other diffraction orders to couple inefficiently into the output fibres, thereby reducing crosstalk. Thus a switch system as described may incorporate a (single) filter a common plane for all output beams on the 1×N WSS switch structure. As in embodiments the relay system simply images the LCOS SLM plane at plane $P_o$, the implementation reduces to optimizing the output optics and the LCOS SLM hologram pattern. In the following section we discuss two example implementations of this approach in the context of the switch designs we describe.

Crosstalk from a blazed grating occurs due to quantization of the displayed phase pattern, which can be further exacerbated by the edge effect. The edge effect in a LCOS SLM device is a result of pixel fringing fields (the electric field due to the voltage applied to a pixel leaking across to neighbouring pixels) and liquid crystal material effects, and causes errors in the displayed phase profile (we have described techniques to mitigate this in WO2012/110811). As described in WO2012/123715, we can suppress crosstalk using an Axicon phase structure. For the purposes of the present switch design, we use wavefront encoding based on an Axicon phase element as follows:

An element with an Axicon phase profile, which is characterised by a variation in phase that is linear with respect to radius, is placed at the input objective plane. We denote this element as $A_1$.

This element may be a high resolution diffractive optical element, or refractive component.

If the wavefront leaving the LCOS SLM is simply a plane wave with a certain propagation vector $k(p,\varphi,\lambda)$, the output at the fibre plane will comprise a series of rings as opposed to Gaussian beams.

By adding a counter Axicon phase profile to the grating phase profile we can compensate for the Axicon phase profile of $A_1$.

The signal beam will therefore be focused to a Gaussian beam profile.

Higher and symmetric diffraction orders are focused to rings.

The approach here is that a ring focus may be engineered to miss the fibre core, thereby minimizing crosstalk as the centre of the ring will have minimal optical power. To illustrate this approach we show simulated replay fields in FIG. 13 for three cases:

1) The sub-hologram displaying a blazed grating with no common filter element.
2) The sub-hologram displaying a blazed grating, and the common filter element displaying a quantized Axicon (quantization finer than the LCOS SLM pixel size).
3) The sub-hologram displaying a phase pattern that is a combination of the blazed grating and an inverse of the common filter Axicon phase profile.

Figure 13:
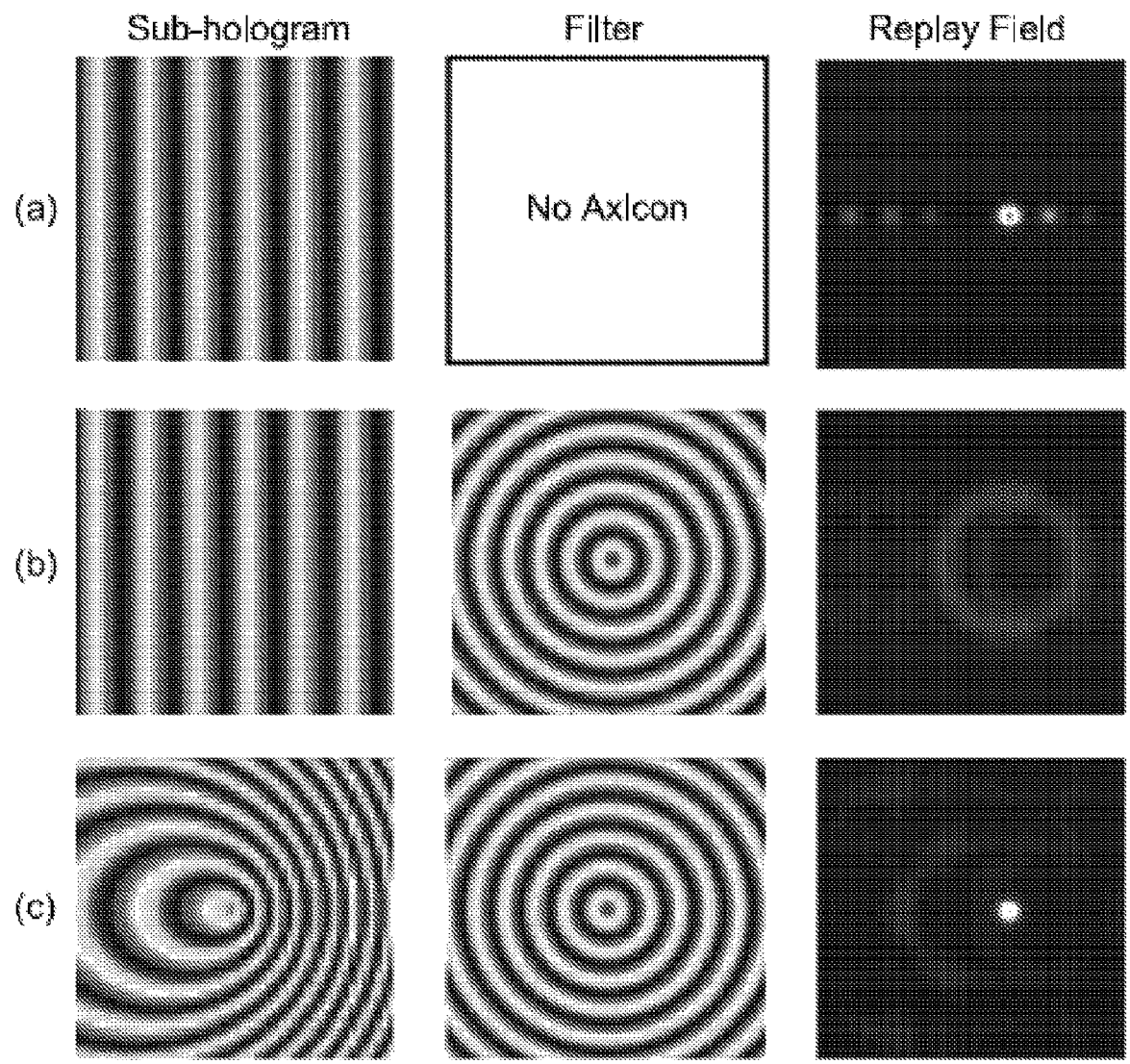
FIG. 13 illustrates an example of common filtering at objective lens input plane using an axicon phase component.

In FIG. 13 the columns show the phase pattern at the sub-hologram plane, the filter, and the corresponding replay plane. The rows show (a) grating and no Axicon, (b) grating and Axicon, and (c) modified grating (grating plus compensating Axicon phase profile) and Axicon. As can be seen, in (c) the higher and symmetric crosstalk orders of (a) are now spatially dispersed into effectively rings, whilst the signal beam is still focused. For this specific simulation, the calculations assume a sub-hologram of 50×50 pixels with an incident Gaussian beam radius one fifth of the sub-hologram size. The grating period is eight pixels, and the Axicon slant angle is 3°. A total of 128 phase levels are assumed, and the nematic liquid crystal edge effect is included in the simulation.

The wavefront modification element of FIG. 12 may comprise a more general matched spatial filter, for example of the type used in optical correlator technology and optical data encryption. The phase profile of the filter may be optimized to diffract light away from the fibre cores unless an inverse phase profile is added to the grating phase profile. It should be noted that the common matched spatial filters in a stacked 1×N WSS may be implemented using the LCOS SLM, thereby allowing for possible reconfiguration. An advantage of this approach is that one can optimize the matched spatial filter phase profile to minimize crosstalk in an arbitrary manner.

In a further approach one can supress crosstalk by adding focal power to the sub-hologram and by realigning the optical planes such that only the +1 order is focused at the fibre plane. In this case no additional element need be used at the input plane of the objective lens as the objective lens itself is essentially the filter.

Design of a Stacked 1×N WSS Module

Now referring back once again to FIG. 2, this illustrates an embodiment of the stacked 1×N WSS optical architecture shown in FIG. 4. This is derived from the 1×8 WSS embodiment of FIGS. 5 and 6. As each 3×3 fibre cluster is located at a different lateral position in the y-direction, on passing through the relay lenses ($L_1$ and $L_2$) and the DEMUX grating, the input signals from the S (1×8) WSS input ports will be:

Still be dispersed in the x-direction.

Imaged at different lateral positions in the y-direction. As a result, independent rows of sub-holograms can be used to control the signal routing for each of the M switches. As shown in FIG. 6, the light is inverted by the 4f relay optics.

One can therefore implement S individual 1×8 WSSs using a common relay system ($L_1$ and $L_2$), a common DEMUX grating ($P_g$), a single SLM, and an array of S objective lenses ($L_4$) and a set of S (3×3) fibre arrays spaced along the y-axis of the system.

In terms of scalability, a 4K LCOS SLM based on sub-holograms of size 50×50 pixels for a 50 GHz channel slot can support up to S=40 individual 1×N WSSs, with N=8 for a square packed output array, and N=12 for a Hexagonally packed output array. These values for N assume a minimum average number of pixels per period of 7.5 pixels.

Thus in some preferred implementations the switch uses square (or rectangular) sub-holograms, preferably with three or more rows of sub-holograms, preferably steering the demultiplexed beams in two-dimensions, preferably arranging the output ports as a two-dimensional array. Thus some preferred implementations use a relay system based on spherical optics to simultaneously direct wavelength channels to square sub-holograms.

Preferably embodiments of the system use a single objective lenslet per 1×N WSS. In some embodiments each array of output ports may be clustered behind a common telecentric lens array (in embodiments one lens/lenslet per port array). However in embodiments the optics need not be telecentric. Moreover a port array need not be a square (or rectangular) array and in embodiments a hexagonal array is employed to increase port count.

In embodiments optical separation between the output ports may be improved by employing either a magnification stage after the relay optics, more particularly after a virtual input/output plane in the system (optionally with a further lens/lenslet array); or by employing the objective lens/lenslet array in a non-telecentric configuration. Both these approaches help to mitigate crosstalk.

Steering in two dimensions is advantageous as the total pixel count of the square (or rectangular) sub-holograms may be relatively smaller than if steering in one dimension, and more output ports may be provided, for example 8 (N=8) in a square or rectangular array, or 12 (N=12) in a hexagonal array. Clustering the output fibres is advantageous in part because it facilitates the use of multi-core fibres to support the N output ports, which in turn simplifies fibre handling and switch interfacing.

When using a displayed grating for switching one consequence of using a square or hexagonally packed arrangement of output ports is that when determining a diffraction pattern to display attention need only be given to optimising the $-1$, $+1$ and $0^{th}$ orders, which simplifies the sub-hologram. Moreover by offsetting the input fibre away from the centre of an array and/or by tilting the system (more specifically by tilting the SLM at an angle with respect to an axis of the input signals), in particular such that the $0^{th}$ order is launched into the central output fibre (which may then be unused), one can substantially maintain port count whilst reducing the optimisation to primarily the $-1$ and $+1$ orders. This helps to reduce the need for optical isolation on the input ports to inhibit back reflection.

Optionally a staggered output fibre array may also be employed to supress crosstalk. In embodiments this may involve longitudinally offsetting some of the N output fibres in a direction parallel to the axis of the optical fibres. The WSS may also use wavefront encoding based on defocus to supress residual crosstalk and/or may employ wavefront encoding using a common (spatial) filter at the objective lenslet input plane to supress residual crosstalk. In principle the design may be extended from a 1×N WSS to an M×N WSS, that is where each unit (array) has multiple inputs and outputs.

SDM WSS Based on Stacked WSSs

Figure 14A:
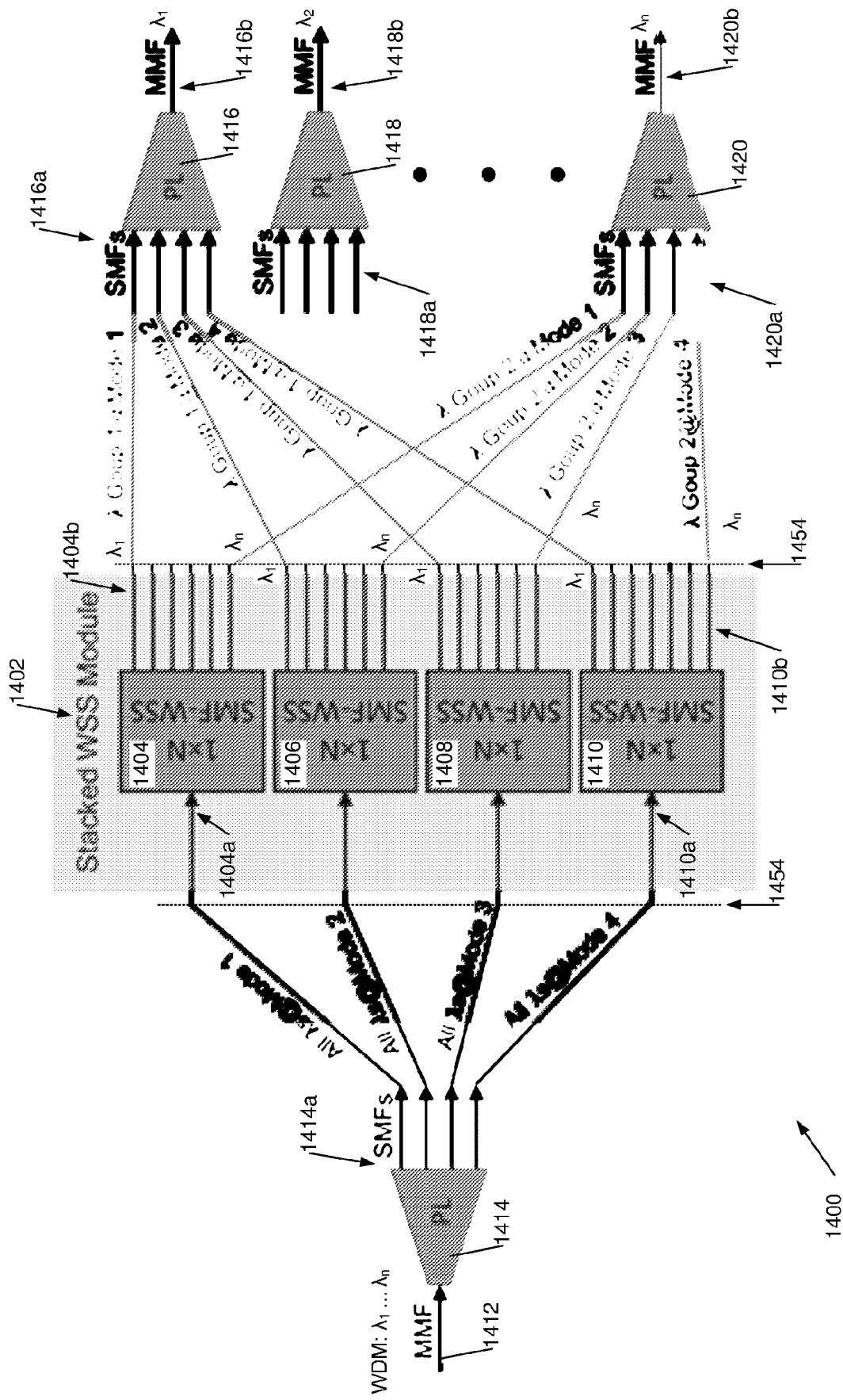
FIGS. 14a and 14b show, respectively a block diagram of a space-division multiplexed fibre reconfigurable WSS switch according to a first embodiment of the invention, and a perspective view of a space-division multiplexed fibre reconfigurable WSS switch according to a second embodiment of the invention.

Referring now to FIG. 14a, this shows a block diagram of a space-division multiplexed (SDM) fibre, reconfigurable, wavelength-selective switch (WSS) 1400 according to an embodiment of the invention.

The switch comprises a stacked WSS module 1402, for example as previously described with reference to FIGS. 5a and 2e. The stacked module 1402 comprises a plurality of 1×N single mode fibre (SMF) WSSs 1404-1410, each having a respective input 1404a-1410a and a respective plurality of outputs 1404b-1410b. The SDM-WSS 1400 has an SDM input 1412, for example an MMF (multimode fibre) input port, which is coupled to an optical space division demultiplexer 1414. Demultiplexer 1414 provides a plurality of space division demultiplexed optical outputs 1414a, for example on single mode fibres. Each space division demultiplexed output 1414a is coupled to a respective input of one of the 1×N switches 1404-1410. Thus each switch receives a complete set of wavelengths of the input WDM signal from a different respective space division demultiplexed mode of the input signal. For example, as illustrated, a first mode is provided to switch 1404, a second mode to switch 1406, a third mode to switch 1408, and a fourth mode to switch 1410. Thus each of switches 1404-1410 handles a separate SDM mode of the optical input.

The SDM-WSS 1400 also includes a plurality of optical multiplexers of which three multiplexers 1416, 1418 and 1420 are illustrated. In general, one multiplexer is provided for each wavelength output of switches 1404-1410, that is for each wavelength of a WDM signal for which the architecture is designed. Each multiplexer has a respective set of inputs 1416a, 1418a, 1420a and each of these is coupled to a respective output of one of switches 1404-1410. As illustrated the same (i.e. corresponding) output from each switch goes to each multiplexer but it will be appreciated that this is not a requirement since the labelling of the outputs is arbitrary. However in operation the switches 1404-1410 are controlled so that the same wavelength component across different modes is provided to the same multiplexer. Each of multiplexers 1416, 1418, 1420 also has a respective output port 1416b, 1418b, 1420b for making connection to a respective SDM fibre such as a multicore and/or multimode fibre.

In the illustrated example connections between the outputs 1404b-1410b of the switches and the inputs 1416a-1420a of the multiplexers are made using single mode fibres. However the skilled person will appreciate that these and other connections within the device the connections may comprise fibre and/or other waveguide and/or free space optics.

In the illustrated example the inputs and outputs comprise multimode fibre and the demultiplexer 1414 and multiplexers 1416-1420 each comprise a photonic lantern. Suitable devices are available for purchase, for example from Optoscribe Ltd, Livingstone, UK.

Alternatively some or all of the demultiplexer and/or multiplexers may comprise a Multi-Plane Light Converter, for example of the type described in, "Efficient and Mode Selective Spatial Mode Multiplexer Based on Multi-plane Light Conversion", G Labroille et al., Optics Express 15599-15607, 22(13), 30 Jun. 2014. Such devices are sold by CAILabs SAS, Rennes, France. Such a device operates, in embodiments, by providing a succession of transverse phase profiles that, separated by optical Fourier transforms, achieves a unitary transform between N separate beams and N orthogonal modes of a few-mode fibre. This may be implemented in a compact form by printing the phase profiles on a single reflective phase plate each phase profile located at a different spot on the plate, and obtaining optical Fourier transforms by propagation and reflections on a spherical mirror (with an aperture to allow beams to enter and exit the cavity). Use of such a device has the potential advantage of reduced signal loss.

In the case of multicore fibre the demultiplexer 1414 and/or multiplexers 1416-1420 may comprise a fan-out or fan-in optical coupler.

Figure 14B:
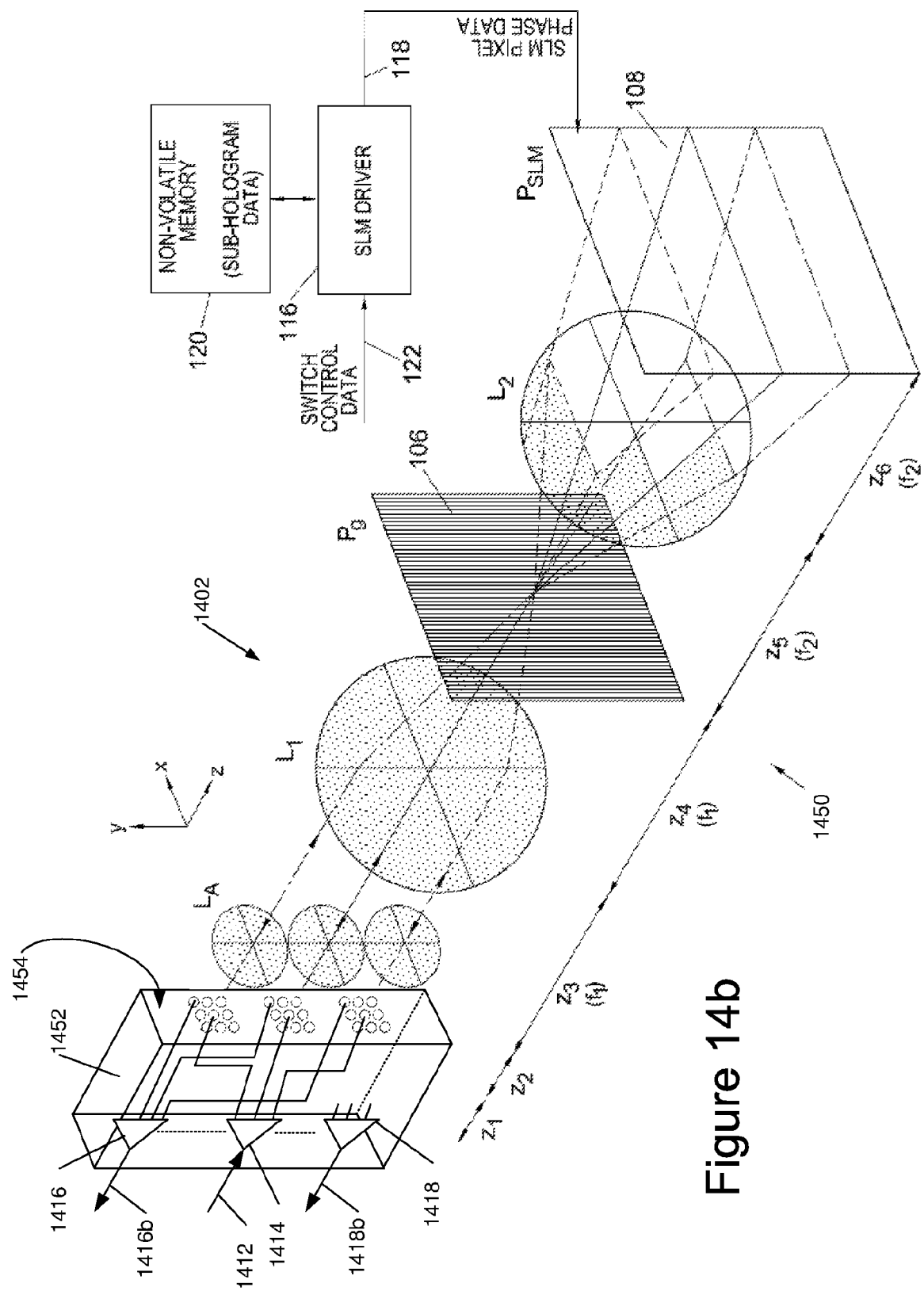

Referring now to FIG. 14*b*, this shows a perspective view of a second embodiment of an SDM-WSS switch 1450. Switch 1450 has a similar architecture to switch 1400 of FIG. 14*a* but has a potentially more convenient practical implementation. FIG. 14*b* is modified from FIG. 2*a* and like elements to those previously described are indicated by like reference numerals.

In FIG. 14*b* a single block 1452 of optically transparent material, such as glass or plastic, integrates both the demultiplexer 1414 and re-multiplexers 1416-1420 of FIG. 14*a*. Block 1452 also incorporates the (preferably single mode) waveguides coupling the de-multiplexer outputs to the stacked WSS module and coupling the stacked WSS module outputs to the re-multiplexer inputs. For convenience of illustration only two multiplexers are illustrated in FIG. 14*b* but the skilled person will appreciate that more may be provided.

In the arrangement of FIG. 14*b* one face 1454 of block 1452 defines a surface, more particularly a plane, providing input and output interfaces to the stacked WSS module 1402. The location of this plane is illustrated conceptually in FIG. 14*a*. In the example of FIG. 14*b* the stacked WSS module is in a folded configuration and thus a single plane defines both the optical input and output connections to the switch module. However the skilled person will appreciate that the arrangement of FIG. 14*b* may be unfolded, in a manner similar to that shown in FIG. 5*a*, described above.

Demultiplexer 1414 provides an output to the input port of each switch of the stack, as illustrated. In the example there are 8 output ports from each switch and thus 8 multiplexers should be employed, of which only two are shown. Only one set of waveguide connections between the switch outputs and optical multiplexer 1416 is shown for simplicity of illustration, but in reality each switch output will go to a multiplexer as previously described with reference to FIG. 14*a*. Although the waveguide connections within block 1452 are shown as crossing in the drawing, each waveguide connection takes a path in 3D through the block so that intersections between the individual waveguides can be avoided. In a manner known to those skilled in the art a waveguide can be written to define a particular path in 3 dimensions using laser inscription techniques. Optoscribe Ltd (ibid) are able to fabricate such devices.

The input and output connections fibre connections to block 1452 may each simply comprise an aperture, preferably with a V-groove, into which a fibre end may be pushed and glued.

It will be recognised that a significant advantage of the arrangement of FIG. 14*b* is that, in embodiments, no fibre connection is needed between the demultiplexer and re-multiplexers and the stacked WSS module.

Broadly speaking we have described an architecture in which input signals which are both SDM and WDM are spatially de-multiplexed into a set of single mode waveguides, each of which carries WDM signals of a spatial mode of the input fibre. Each WSS of the stacked module performs wavelength selective switching for the WDM signals from the corresponding spatial mode, and subsequently a multiplexer for each output SDM signal multiplexers WDM signals from the stacked WSSs into different spatial modes of the output signals.

The architecture of FIG. 14 can potentially provide a good passband performance for all the spatial modes in the SDM optical input and the wavelength channels can be densely packed. In embodiments the number of independent WSSs in the stacked module determines the number of space division modes the device can process. The port count of each single mode WSS in the stacked module determines the port count of the SDM-WSS. For example if 48 1×12 switches are employed the SDM-WSS may be used as a 1×12 48-mode fibre WSS. If the stacked WSS module comprises 8 1×32 switches then the architecture can provide a 1×32 8-mode fibre WSS.

The skilled person will recognise that the SDM-WSS switch we have described is not limited to any particular wavelength or wavelength band—for example it may be used in C-band or in the 800-1200 nm range.

As previously mentioned, the SDM-WSS may be used in a folded or unfolded configuration. Similarly the device is agnostic as to the direction of travel of light through the device, and thus the outputs may be used as inputs and the input as an output. Those skilled in the art will also appreciate that although a single stacked WSS module is shown in FIG. 14*a*, in principle more than one stacked WSS module may be provided prior to multiplexers 1416-1420 to perform additional switching/routing functions prior to the outputs.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A space-division multiplexed (SDM), reconfigurable, wavelength-selective switch (WSS), the switch comprising:
   a space-division multiplexed (SDM) optical input port to receive a space-division multiplexed (SDM) optical input signal comprising a plurality of space division modes each of said space division modes carrying a respective data signal, wherein each of said space division modes is also wavelength division multiplexed (WDM);
   an optical space division demultiplexer, coupled to said input port, to split said space-division multiplexed (SDM) optical input signal into a plurality of space division demultiplexed optical signals on separate demultiplexer outputs of said demultiplexer, each said demultiplexer output of said demultiplexer comprising a wavelength division multiplexed one of said plurality of space division modes;
   a set of reconfigurable wavelength-selective optical switches, each reconfigurable wavelength-selective optical switch having a switch input and a set of N switch outputs, and each including a dispersive element and a controllable beam steering element such that each said reconfigurable wavelength-selective optical switch is reconfigurable to selectively direct different respective wavelengths of a WDM optical signal at said switch input to different selected outputs of said set of N switch outputs, and
   wherein each said demultiplexer output is coupled to said switch input of a respective one of said set of reconfigurable wavelength-selective optical switches; and
   a set of optical space division multiplexers, one for each of said N switch outputs, each said optical space division multiplexer having a set of multiplexer inputs and a multiplexer output, to re-multiplex optical signals at said multiplexer inputs into a space-division multiplexed optical output signal at said multiplexer output, and wherein, for each of said set of optical space division multiplexers, each multiplexer input of said set of multiplexer inputs is coupled to said switch output of a different respective one of said set of reconfigurable wavelength-selective optical switches.

2. A SDM reconfigurable WSS switch as claimed in claim 1 further comprising one or more controllers to control said set of reconfigurable wavelength-selective optical switches such that different respective wavelengths of each said wavelength division multiplexed space division mode are routed to different respective ones of said set of optical space division multiplexers.

3. A SDM reconfigurable WSS switch as claimed in claim 2 wherein each multiplexer of said set of optical space division multiplexers receives the same selected wavelength from each different reconfigurable wavelength-selective optical switch to which it is coupled.

4. A SDM reconfigurable WSS switch as claimed in claim 1, wherein each multiplexer of said set of optical space division multiplexers receives a different mode of said plurality of space division modes from each different reconfigurable wavelength-selective optical switch to which it is coupled.

5. A SDM reconfigurable WSS switch as claimed in claim 1 wherein said space-division multiplexed (SDM) optical input port comprises a multimode SDM fibre input port to receive a multimode SDM optical input signal.

6. A SDM reconfigurable WSS switch as claimed in claim 1 wherein one or more of said optical space division demultiplexer and said set of optical space division multiplexers comprises a photonic lantern.

7. A SDM reconfigurable WSS switch as claimed in claim 1 wherein one or more of said optical space division demultiplexer and said set of optical space division multiplexers comprises a multi-plane light converter (MPLC), wherein said MPLC comprises an optical path including a plurality of phase profiles and optical space-frequency transforms to convert between a multimode SDM optical signal and a plurality of separate mode optical signals.

8. A SDM reconfigurable WSS switch as claimed in claim 1 wherein said space-division multiplexed (SDM) optical input port comprises a multicore SDM fibre input port to receive a multicore SDM fibre.

9. A SDM reconfigurable WSS switch as claimed in claim 1 wherein one or more of said optical space division demultiplexer and said set of optical space division multiplexers comprises a fan out/in optical coupler to couple between a SDM multicore fibre and a plurality of separate optical paths, for respective cores of said multicore fibre.

10. A SDM reconfigurable WSS switch as claimed in claim 1 wherein said controllable beam steering element of said reconfigurable wavelength-selective optical switch comprises a reconfigurable holographic array on an optical path between said switch input port and said N switch outputs;

said reconfigurable wavelength-selective optical switch further comprising:
at least one diffractive element on an optical path between said switch input and said reconfigurable holographic array, to demultiplex a wavelength division multiplexed (WDM) space division mode of said optical input signal into a plurality of wavelength-demultiplexed optical channels and to disperse said wavelength-demultiplexed optical channels spatially along a first axis on said reconfigurable holographic array;

wherein said reconfigurable holographic array comprises an array of configurable sub-holograms, said array extending along said first axis, wherein a sub-hologram is configured to direct a wavelength-demultiplexed optical channel to a respective selected one of said switch outputs.

11. A SDM reconfigurable WSS switch as claimed in claim 1 wherein said set of reconfigurable wavelength-selective optical switches comprises:

a set of arrays of optical connections, each comprising an array of said switch outputs and having a switch input to receive a wavelength division multiplexed (WDM) space division mode of said optical input signal, wherein arrays of said set of arrays receive respective ones of said plurality of space division demultiplexed optical signals;

a first diffractive element to demultiplex said WDM space division mode of said optical input signal into a plurality of wavelength-demultiplexed optical channels, and to disperse said wavelength-demultiplexed optical channels spatially along a first axis;

first relay optics between said set of arrays of optical connections and said first diffractive element; and a reconfigurable holographic array comprising a 2D array of reconfigurable sub-holograms defining sub-hologram rows and columns;

wherein array of said set of arrays are at least one dimensional arrays extending spatially in a direction parallel to said first axis and arranged in a column defining a second axis orthogonal to said first axis;

wherein said sub-hologram rows are aligned along said first axis, and wherein said sub-hologram columns are aligned along said second axis;

wherein a number of said sub-hologram rows corresponds to at least a number of arrays in said set of arrays; and wherein each sub-hologram row is configured to receive a set of wavelength-demultiplexed optical channels at different carrier wavelengths demultiplexed from the WDM space division mode of said optical input signal received by the array of the set of arrays to which the row corresponds;

wherein each of said sub-holograms in a sub-hologram row is reconfigurable to steer a respective wavelength-demultiplexed optical channel of the WDM space division mode of said optical input signal for the array to which the sub-hologram row corresponds, towards a selected said optical output for the array; and wherein each said sub-hologram row is configured to steer the wavelength-demultiplexed optical channels of a respective one of said plurality of space division demultiplexed optical signals.

12. A method of switching a set of optical input signals wherein the optical input signals are both space-division multiplexed (SDM) and wavelength-division multiplexed (WDM), the method comprising:

receiving an optical input signal comprising a plurality of space division modes, wherein at least some of said space division modes are also wavelength division multiplexed;

demultiplexing a space-division multiplexed (SDM) part of said optical input signal into a plurality of space division demultiplexed optical signals each comprising a wavelength division multiplexed one of said plurality of space division modes;

providing each wavelength division multiplexed (WDM) space division mode to a respective reconfigurable wavelength-selective optical switch having a plurality of switch outputs, one for each wavelength of said wavelength division multiplexed space division mode such that each optical switch is configured to switch one of said space division modes;

re-multiplexing said switch outputs using a plurality of re-multiplexers such that each re-multiplexer re-multiplexes one switch output of each optical switch; and selectively directing different respective wavelengths of each WDM space division mode of said optical input signal to said switch outputs, in coordination such that each said re-multiplexer receives the same wavelength and a different one of said plurality of space division modes.

13. A method as claimed in claim 12 wherein each optical switch has a plurality of N switch outputs, the method further comprising providing an ith respective switch output of each optical switch to the same said re-multiplexer, and controlling said optical switches in coordination such that the same wavelength of each of said space division modes is routed to the same ith switch output for re-multiplexing.

14. A method as claimed in claim 12 or 13 comprising receiving said optical input signal on a space division multiplexed (SDM) fibre, and wherein said plurality of space division modes comprises one or both of space division modes of a multimode fibre (MMF) optical signal and space division modes of a multicore fibre (MCF) optical signal.

15. An optical system comprising:
a set of optical inputs each to receive a space-division multiplexed (SDM) optical input signal at a different respective wavelength, each said optical input signal comprising a plurality of space division modes, each of said space division modes carrying a respective data signal;
a combined optical signal output;
a set of optical space division demultiplexers, one for each of said different respective wavelength, each demultiplexer coupled to a respective said optical input to split the SDM optical input signal at the respective said optical input into a plurality of space division demultiplexed optical signals at the same wavelength on separate demultiplexer outputs of the demultiplexer, wherein each of said plurality of space division demultiplexed optical signals comprises a different respective space division mode of said plurality of space division modes;
a set of reconfigurable optical switches, one for each of said plurality of space division modes, each reconfigurable optical switch having a set of N switch inputs and a common switch output,
wherein, for each said demultiplexer, each one of said demultiplexer outputs is coupled to a different respective one of said optical switches; and
wherein each optical switch includes a dispersive element and a controllable beam steering element such that each said optical switch is reconfigurable to selectively direct a different respective wavelength from each of said demultiplexers to the common switch output of the optical switch, each said optical switch being configured to process one of said plurality of space division modes; and
a re-multiplexer having a set of re-multiplexer inputs each coupled to said common switch output of a respective one of said reconfigurable optical switches, and having a re-multiplexer output coupled to said combined optical signal output, to re-multiplex said plurality of space division modes from said set of reconfigurable optical switches for output.

* * * * *